United States Patent
Murayama

(10) Patent No.: US 10,549,527 B2
(45) Date of Patent: Feb. 4, 2020

(54) PRINTING APPARATUS, PRINTING SYSTEM, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yoshiaki Murayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/018,576

(22) Filed: Jun. 26, 2018

(65) Prior Publication Data
US 2019/0009517 A1   Jan. 10, 2019

(30) Foreign Application Priority Data

Jul. 4, 2017 (JP) ................. 2017-131496

(51) Int. Cl.
| | |
|---|---|
| B41J 2/005 | (2006.01) |
| B41J 2/045 | (2006.01) |
| B41M 5/00 | (2006.01) |
| B41J 13/08 | (2006.01) |
| G06K 15/02 | (2006.01) |
| B41J 2/01 | (2006.01) |

(52) U.S. Cl.
CPC ......... *B41J 2/0057* (2013.01); *B41J 2/04513* (2013.01); *B41J 13/08* (2013.01); *B41M 5/0017* (2013.01); *G06K 15/02* (2013.01); *B41J 2002/012* (2013.01); *B65H 2301/541* (2013.01)

(58) Field of Classification Search
CPC ...... B41J 2/0057; B41J 2/04513; B41J 13/08; B41J 2002/012; G06K 15/02; B41M 5/0017; B41M 5/0256; B65H 2301/541
USPC ....................................... 358/1.14
See application file for complete search history.

(56) References Cited

U.S. PATENT DOCUMENTS

| | | | |
|---|---|---|---|
| 8,727,477 B2 | 5/2014 | Kosaka et al. | |
| 9,278,552 B2 | 3/2016 | Teshigawara et al. | |
| 9,434,196 B2 | 9/2016 | Fukasawa et al. | |
| 2006/0001722 A1* | 1/2006 | Stelter | B41J 2/0057 347/103 |

FOREIGN PATENT DOCUMENTS

JP   2014-205336 A   10/2014

\* cited by examiner

*Primary Examiner* — Tammy Paige Goddard
*Assistant Examiner* — Darryl V Dottin
(74) *Attorney, Agent, or Firm* — Venable LLP

(57) ABSTRACT

A printing apparatus includes a transfer member configured to cyclically pass through a formation area of an ink image and a transfer area where the ink image is transferred to a cut sheet, the transfer member including a plurality of areas that allow printing on a plurality of cut sheets in one rotation. A control unit controls a print head so as to use some areas of the transfer member for the formation of the ink image, and decides, in accordance with a use count of each of the plurality of areas for printing, an area on which an ink image based on print data is formed so as to use, for printing, an area having a use count that is lowest, among the plurality of areas of the transfer member, more often than other areas of the plurality of areas of the transfer member.

15 Claims, 25 Drawing Sheets

FIG. 11

| No. | MODE | NUMBER OF COPIES |
|---|---|---|
| 1 | IMAGE 1 | N |
| 2 | IMAGE 2 | 1 |
| 3 | IMAGE 3 | N |
| 4 | IMAGE 4 | 1 |
| 5 | IMAGE 5 | 1 |
| 6 | IMAGE 3 | 1 |
| ⋮ | ⋮ | ⋮ |
| XX-1 | IMAGE G | 1 |
| XX | END | 0 |

FIG. 12

| No. | MODE | NUMBER OF COPIES |
|---|---|---|
| 1 | IMAGE 1 | 1 |
| 2 | Non | 3 |
| 3 | IMAGE 2 | 1 |
| 4 | Non | 3 |
| 5 | IMAGE 3 | 2 |
| 6 | Non | 2 |
| 7 | IMAGE 4 | 1 |
| 8 | IMAGE 5 | 1 |
| 9 | IMAGE 6 | 1 |
| 10 | IMAGE 7 | 1 |
| ⋮ | ⋮ | ⋮ |
| XX-1 | IMAGE G | 1 |
| XX | END | 0 |

FIG. 13A

| JOB 1 | | | |
|---|---|---|---|
| No. | MODE | TRANSFER MEMBER | RESOLUTION |
| 1 | IMAGE 1 | A | 1200 |
| 2 | Non | B | - |
| 3 | IMAGE 2 | C | 1200 |
| 4 | Non | D | - |
| 5 | IMAGE 3 | A | 1200 |
| 6 | Non | B | - |
| 7 | IMAGE 4 | C | 1200 |
| 8 | Non | D | - |
| 9 | IMAGE 5 | A | 1200 |
| 10 | Non | B | - |
| 11 | IMAGE 6 | C | 1200 |
| 12 | Non | D | - |
| 13 | IMAGE 7 | A | 1200 |
| 14 | Non | B | - |
| 15 | IMAGE 8 | C | 1200 |
| 16 | Non | D | - |
| 17 | IMAGE 9 | A | 1200 |
| 18 | Non | B | - |
| 19 | IMAGE 10 | C | 1200 |
| 20 | Non | D | - |

FIG. 13B

| TRANSFER MEMBER | | | |
|---|---|---|---|
| A | B | C | D |
| 5 | 0 | 5 | 0 |

FIG. 13C

| No. | MODE | TRANSFER MEMBER | RESOLUTION |
|---|---|---|---|
| \multicolumn{4}{c}{JOB 2} | | | |

| No. | MODE | TRANSFER MEMBER | RESOLUTION |
|---|---|---|---|
| 1 | IMAGE 1 | A | 1200 |
| 2 | Non | B | - |
| 3 | IMAGE 2 | C | 1200 |
| 4 | Non | D | - |
| 5 | IMAGE 3 | A | 1200 |
| 6 | Non | B | - |
| 7 | IMAGE 4 | C | 1200 |
| 8 | Non | D | - |
| 9 | IMAGE 5 | A | 1200 |
| 10 | Non | B | - |
| 11 | IMAGE 6 | C | 1200 |
| 12 | Non | D | - |
| 13 | IMAGE 7 | A | 1200 |
| 14 | Non | B | - |
| 15 | IMAGE 8 | C | 1200 |
| 16 | Non | D | - |
| 17 | IMAGE 9 | A | 1200 |
| 18 | Non | B | - |
| 19 | IMAGE 10 | C | 1200 |
| 20 | Non | D | - |

FIG. 13D

| TRANSFER MEMBER | | | |
|---|---|---|---|
| A | B | C | D |
| 5 | 0 | 5 | 0 |

FIG. 13E

| TRANSFER MEMBER | | | |
|---|---|---|---|
| A | B | C | D |
| 10 | 0 | 10 | 0 |

FIG. 14A

| | JOB 1 | | |
|---|---|---|---|
| No. | MODE | TRANSFER MEMBER | RESOLUTION |
| 1 | IMAGE 1 | A | 1200 |
| 2 | Non | B | - |
| 3 | IMAGE 2 | C | 1200 |
| 4 | Non | D | - |
| 5 | IMAGE 3 | A | 1200 |
| 6 | Non | B | - |
| 7 | IMAGE 4 | C | 1200 |
| 8 | Non | D | - |
| 9 | IMAGE 5 | A | 1200 |
| 10 | Non | B | - |
| 11 | IMAGE 6 | C | 1200 |
| 12 | Non | D | - |
| 13 | IMAGE 7 | A | 1200 |
| 14 | Non | B | - |
| 15 | IMAGE 8 | C | 1200 |
| 16 | Non | D | - |
| 17 | IMAGE 9 | A | 1200 |
| 18 | Non | B | - |
| 19 | IMAGE 10 | C | 1200 |
| 20 | Non | D | - |

FIG. 14B

| TRANSFER MEMBER | | | |
|---|---|---|---|
| A | B | C | D |
| 5 | 0 | 5 | 0 |

FIG. 14C

| JOB 2 | | | |
|---|---|---|---|
| No. | MODE | TRANSFER MEMBER | RESOLUTION |
| 1 | IMAGE 1 | B | 1200 |
| 2 | Non | C | – |
| 3 | IMAGE 2 | D | 1200 |
| 4 | Non | A | – |
| 5 | IMAGE 3 | B | 1200 |
| 6 | Non | C | – |
| 7 | IMAGE 4 | D | 1200 |
| 8 | Non | A | – |
| 9 | IMAGE 5 | B | 1200 |
| 10 | Non | C | – |
| 11 | IMAGE 6 | D | 1200 |
| 12 | Non | A | – |
| 13 | IMAGE 7 | B | 1200 |
| 14 | Non | C | – |
| 15 | IMAGE 8 | D | 1200 |
| 16 | Non | A | – |
| 17 | IMAGE 9 | B | 1200 |
| 18 | Non | C | – |
| 19 | IMAGE 10 | D | 1200 |
| 20 | Non | A | – |

FIG. 14D

| TRANSFER MEMBER | | | |
|---|---|---|---|
| A | B | C | D |
| 0 | 5 | 0 | 5 |

FIG. 14E

| TRANSFER MEMBER | | | |
|---|---|---|---|
| A | B | C | D |
| 5 | 5 | 5 | 5 |

FIG. 18A

| JOB | | | |
|---|---|---|---|
| No. | MODE | TRANSFER MEMBER | RESOLUTION |
| 1 | IMAGE 1 | A | 1200 |
| 2 | Non | B | - |
| 3 | IMAGE 2 | C | 1200 |
| 4 | Non | D | - |
| 5 | IMAGE 3 | A | 1200 |
| 6 | Non | B | - |
| 7 | IMAGE 4 | C | 1200 |
| 8 | Non | D | - |
| 9 | IMAGE 5 | A | 1200 |
| 10 | Non | B | - |
| 11 | Non | C | - |
| 12 | IMAGE 6 | D | 1200 |
| 13 | Non | A | - |
| 14 | IMAGE 7 | B | 1200 |
| 15 | Non | C | - |
| 16 | IMAGE 8 | D | 1200 |
| 17 | Non | A | - |
| 18 | IMAGE 9 | B | 1200 |
| 19 | Non | C | - |
| 20 | IMAGE 10 | D | 1200 |

FIG. 18B

| TRANSFER MEMBER | | | |
|---|---|---|---|
| A | B | C | D |
| 3 | 2 | 2 | 3 |

FIG. 21A

| JOB | | | |
|---|---|---|---|
| No. | MODE | TRANSFER MEMBER | RESOLUTION |
| 1 | IMAGE 1 | A | 1200 |
| 2 | Non | B | - |
| 3 | IMAGE 2 | C | 1200 |
| 4 | Non | D | - |
| 5 | IMAGE 3 | A | 1200 |
| 6 | Non | B | - |
| 7 | IMAGE 4 | C | 1200 |
| 8 | IMAGE 5 | D | 600 |
| 9 | IMAGE 6 | A | 600 |
| 10 | IMAGE 7 | B | 600 |
| 11 | IMAGE 8 | C | 600 |
| 12 | Non | D | - |
| 13 | IMAGE 9 | A | 1200 |
| 14 | Non | B | - |
| 15 | IMAGE 10 | C | 1200 |
| 16 | Non | D | - |
| 17 | IMAGE 11 | A | 1200 |
| 18 | Non | B | - |
| 19 | IMAGE 12 | C | 1200 |
| 20 | Non | D | - |

FIG. 21B

| TRANSFER MEMBER | | | |
|---|---|---|---|
| A | B | C | D |
| 5 | 1 | 5 | 1 |

FIG. 21C

| JOB | | | |
|---|---|---|---|
| No. | MODE | TRANSFER MEMBER | RESOLUTION |
| 1 | IMAGE 1 | A | 1200 |
| 2 | Non | B | – |
| 3 | IMAGE 2 | C | 1200 |
| 4 | Non | D | – |
| 5 | IMAGE 3 | A | 1200 |
| 6 | Non | B | – |
| 7 | IMAGE 4 | C | 1200 |
| 8 | IMAGE 5 | D | 600 |
| 9 | IMAGE 6 | A | 600 |
| 10 | IMAGE 7 | B | 600 |
| 11 | IMAGE 8 | C | 600 |
| 12 | Non | D | – |
| 13 | Non | A | – |
| 14 | IMAGE 9 | B | 1200 |
| 15 | Non | C | – |
| 16 | IMAGE 10 | D | 1200 |
| 17 | Non | A | – |
| 18 | IMAGE 11 | B | 1200 |
| 19 | Non | C | – |
| 20 | IMAGE 12 | D | 1200 |

FIG. 21D

| TRANSFER MEMBER | | | |
|---|---|---|---|
| A | B | C | D |
| 3 | 3 | 3 | 3 |

PRINTING APPARATUS, PRINTING SYSTEM, CONTROL METHOD, AND NON-TRANSITORY COMPUTER-READABLE STORAGE MEDIUM

BACKGROUND OF THE INVENTION

Field of the Invention

The present invention relates to a technique of transferring an ink image to a print medium.

Description of the Related Art

There is provided an inkjet printing apparatus that executes printing by drawing an image on a drum-like intermediate transfer member by a line head and transferring the image from the intermediate transfer member to a cut sheet print medium. Japanese Patent Laid-Open No. 2014-205336 describes a method of allowing such printing apparatus to print an image on a plurality of sheets in one rotation of an intermediate transfer member by using a four-fold intermediate transfer member having a diameter four times the diameter of a reference drum defined based on the length of the sheet to be printed.

For various reasons, it may be impossible to execute printing on a desired number of sheets in one rotation of the intermediate transfer member. For example, when drawing an image on the intermediate transfer member, various processes for forming the image to be transferred are performed. These processes increase the processing time in proportion to the size of the image to be processed. Therefore, as for an image of a large size, the time taken to process one image can be longer than that taken for rotation of the intermediate transfer member for one image. It may be desirable to provide a predetermined interval as a conveyance interval from the viewpoint of the sheet conveyance property. In these cases, the number of images printed in one rotation of the intermediate transfer member is decreased, thereby reducing the paper feeding count. At this time, a portion where printing is executed and a portion where no printing is executed may occur regularly on the intermediate transfer member, and thus physical degradation of the portions of the intermediate transfer member where printing is executed and components related to the portions may progress more than the remaining portions.

SUMMARY OF THE INVENTION

The present invention suppresses degradation of an intermediate transfer member while transferring an image to a print medium appropriately.

According to one aspect of the present invention, there is provided a printing apparatus comprising: a conveyance unit configured to convey a cut sheet; a transfer member configured to cyclically pass through a formation area of an ink image and a transfer area where the ink image is transferred to the cut sheet, having a peripheral length defined based on a length of the cut sheet to which the ink image can be transferred, and including a plurality of areas that allow printing on the plurality of cut sheets in one round; an acquisition unit configured to acquire print data for forming the ink image on the transfer member, that is obtained when an image processing unit processes data representing an image of a print target; a print unit configured to discharge ink to the transfer member based on the print data and form the ink image on the transfer member in the formation area; a transfer unit configured to transfer the ink image from the transfer member to the cut sheet conveyed by the conveyance unit in the transfer area; and a control unit configured to control the number of copies in one round of the transfer member so as to use some of the plurality of areas for the formation of the ink image and so as not to use the remaining areas for the formation of the ink image, and control the formation and transfer of the ink image by deciding, in accordance with one of a use count of each of the plurality of areas of the transfer member for printing and a paper feeding count for each of the plurality of areas of the transfer member, an area where the ink image of the print data is transferred to the cut sheet so as to use, for printing, the area with the count smaller than the counts of the remaining areas more often than the remaining areas.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a table showing an example of the structure of a print order table;

FIG. 12 is a table showing an example of the structure of a print order table formed based on a print condition;

FIGS. 13A to 13E are tables showing the relationship among the print order tables and areas used for printing;

FIGS. 14A to 14E are tables showing the first example of the structure of a print order table according to an embodiment;

FIGS. 18A and 18B are tables showing the second example of the structure of a print order table according to another embodiment;

FIGS. 21A to 21D are tables showing an application example of the print order table according to the embodiment;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiments of the present invention will be described below with reference to the accompanying drawings. In each view, arrows X and Y indicate horizontal directions perpendicular to each other. An arrow Z indicates a vertical direction.

<Printing System>

Figure 1:
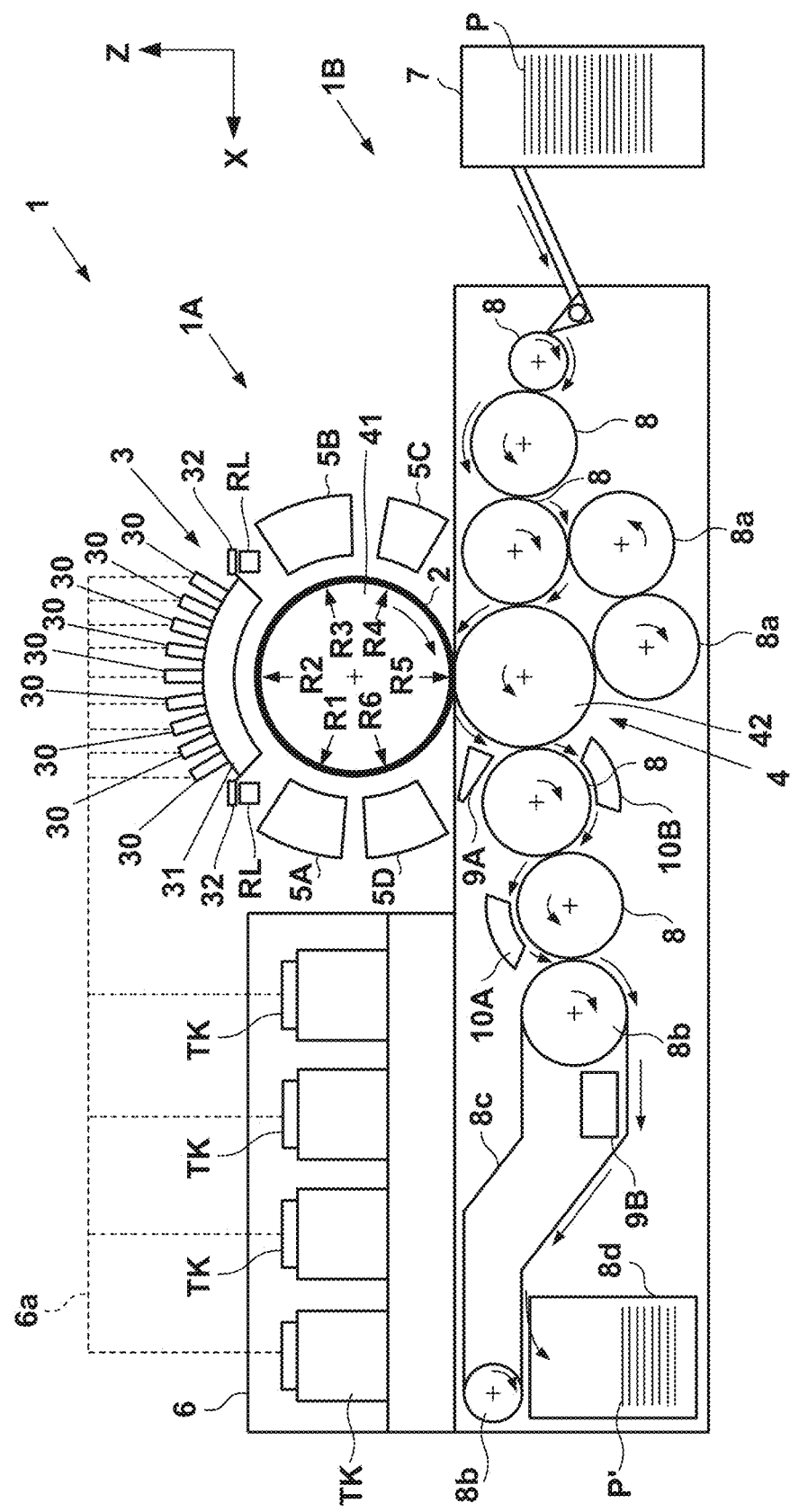
FIG. 1 is a schematic view showing a printing system.

FIG. 1 is a front view schematically showing a printing system 1 according to an embodiment of the present invention. The printing system 1 is a sheet inkjet printer that forms a printed product P' by transferring an ink image to a print medium P via a transfer member 2. The printing system 1 includes a printing apparatus 1A and a conveyance apparatus 1B. In this embodiment, an X direction, a Y direction, and a Z direction indicate the widthwise direction (total length direction), the depth direction, and the height direction of the printing system 1, respectively. The print medium P is conveyed in the X direction.

Note that "print" includes not only formation of significant information such as a character or graphic pattern but also formation of an image, design, or pattern on a print medium in a broader sense or processing of a print medium regardless of whether the information is significant or insignificant or has become obvious to allow human visual perception. In this embodiment, a "print medium" is assumed to be a paper sheet but may be a fabric, plastic film, or the like.

An ink component is not particularly limited. In this embodiment, however, a case is assumed in which aqueous pigment ink that includes a pigment as a coloring material, water, and a resin is used.

<Printing Apparatus>

The printing apparatus 1A includes a print unit 3, a transfer unit 4, peripheral units 5A to 5D, and a supply unit 6.

<Print Unit>

Figure 2:
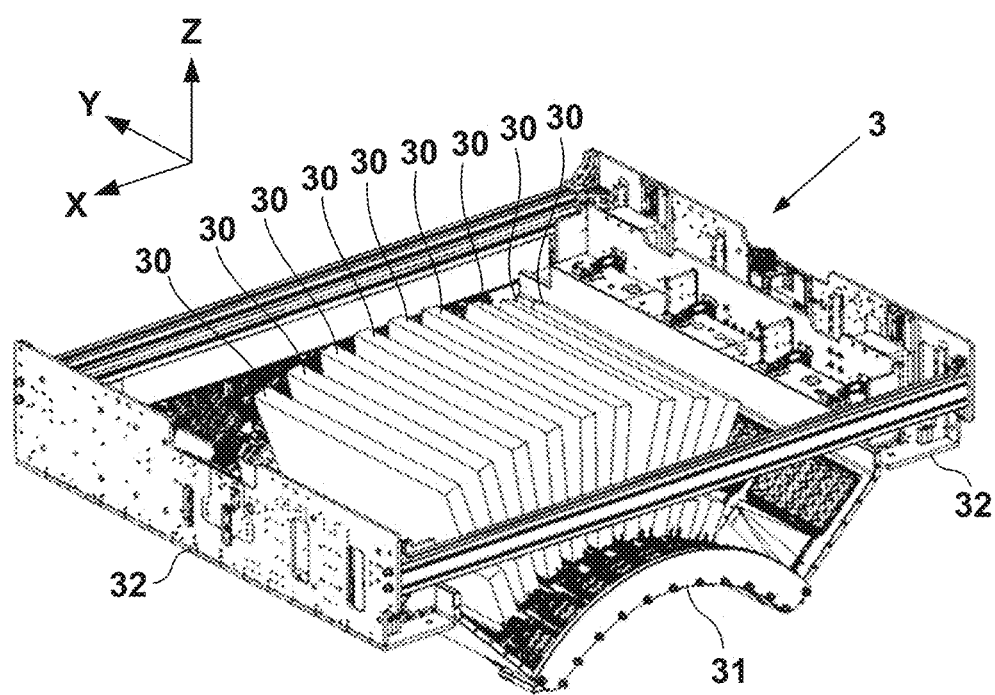
FIG. 2 is a perspective view showing a print unit.

The print unit 3 includes a plurality of printheads 30 and a carriage 31. A description will be made with reference to FIGS. 1 and 2. FIG. 2 is a perspective view showing the print unit 3. The printheads 30 discharge liquid ink to the transfer member 2 and form ink images of a printed image on the transfer member 2.

In this embodiment, each printhead 30 is a full-line head elongated in the Y direction, and nozzles are arrayed in a range where they cover the width of an image printing area of a print medium having a usable maximum size. Each printhead 30 has an ink discharge surface with the opened nozzle on its lower surface, and the ink discharge surface faces the surface of the transfer member 2 via a minute gap (for example, several mm). In this embodiment, the transfer member 2 is configured to move on a circular orbit cyclically, and thus the plurality of printheads 30 are arranged radially.

Each nozzle includes a discharge element. The discharge element is, for example, an element that generates a pressure in the nozzle and discharges ink in the nozzle, and the technique of an inkjet head in a known inkjet printer is applicable. For example, an element that discharges ink by causing film boiling in ink with an electrothermal transducer and forming a bubble, an element that discharges ink by an electromechanical transducer, an element that discharges ink by using static electricity, or the like can be given as the discharge element. A discharge element that uses the electrothermal transducer can be used from the viewpoint of high-speed and high-density printing.

In this embodiment, nine printheads 30 are provided. The respective printheads 30 discharge different kinds of inks. The different kinds of inks are, for example, different in coloring material and include yellow ink, magenta ink, cyan ink, black ink, and the like. One printhead 30 discharges one kind of ink. However, one printhead 30 may be configured to discharge the plurality of kinds of inks. When the plurality of printheads 30 are thus provided, some of them may discharge ink (for example, clear ink) that does not include a coloring material.

The carriage 31 supports the plurality of printheads 30. The end of each printhead 30 on the side of an ink discharge surface is fixed to the carriage 31. This makes it possible to maintain a gap on the surface between the ink discharge surface and the transfer member 2 more precisely. The carriage 31 is configured to be displaceable while mounting the printheads 30 by the guide of each guide member RL. In this embodiment, the guide members RL are rail members elongated in the Y direction and provided as a pair separately in the X direction. A slide portion 32 is provided on each side of the carriage 31 in the X direction. The slide portions 32 engage with the guide members RL and slide along the guide members RL in the Y direction.

Figure 3:
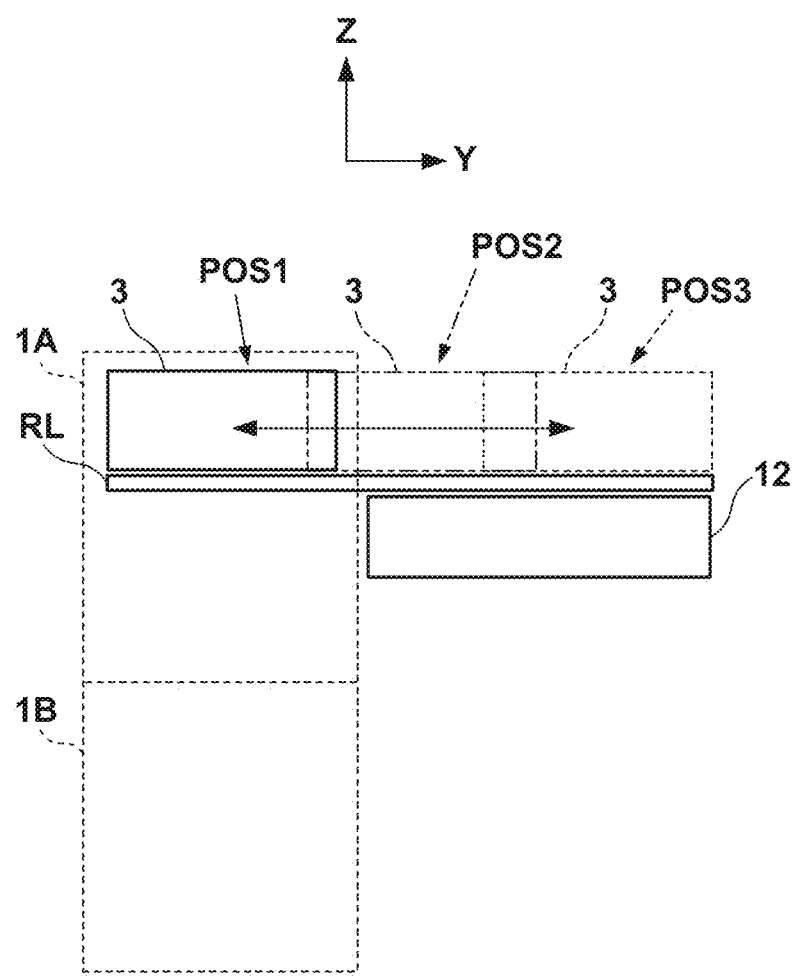
FIG. 3 is an explanatory view showing a displacement mode of the print unit in FIG. 2.

FIG. 3 is a view showing a displacement mode of the print unit 3 and schematically showing the right side surface of the printing system 1. A recovery unit 12 is provided in the rear of the printing system 1. The recovery unit 12 has a function of recovering discharge performance of the printheads 30. For example, a cap mechanism which caps the ink discharge surface of each printhead 30, a wiper mechanism which wipes the ink discharge surface, a suction mechanism which sucks ink in the printhead 30 by a negative pressure from the ink discharge surface can be given as such mechanisms.

The guide member RL is elongated over the recovery unit 12 from the side of the transfer member 2. By the guide of the guide member RL, the print unit 3 is displaceable between a discharge position POS1 at which the print unit 3 is indicated by a solid line and a recovery position POS3 at which the print unit 3 is indicated by a broken line, and is moved by a driving mechanism (not shown).

The discharge position POS1 is a position at which the print unit 3 discharges ink to the transfer member 2 and a position at which the ink discharge surface of each printhead 30 faces the surface of the transfer member 2. The recovery position POS3 is a position retracted from the discharge position POS1 and a position at which the print unit 3 is positioned above the recovery unit 12. The recovery unit 12 can perform recovery processing on the printheads 30 when the print unit 3 is positioned at the recovery position POS3. In this embodiment, the recovery unit 12 can also perform the recovery processing in the middle of movement before the print unit 3 reaches the recovery position POS3. There is a preliminary recovery position POS2 between the discharge position POS1 and the recovery position POS3. The recovery unit 12 can perform preliminary recovery processing on the printheads 30 at the preliminary recovery position POS2 while the printheads 30 move from the discharge position POS1 to the recovery position POS3.

<Transfer Unit>

The transfer unit 4 will be described with reference to FIG. 1. The transfer unit 4 includes a transfer drum 41 and a pressurizing drum 42. Each of these drums is a rotating member that rotates about a rotation axis in the Y direction and has a cylindrical outer peripheral surface. In FIG. 1, arrows shown in respective views of the transfer drum 41 and the pressurizing drum 42 indicate their rotation directions. The transfer drum 41 rotates clockwise, and the pressurizing drum 42 rotates counterclockwise.

The transfer drum 41 is a support member that supports the transfer member 2 on its outer peripheral surface. The transfer member 2 is provided on the outer peripheral surface of the transfer drum 41 continuously or intermittently in a circumferential direction. If the transfer member 2 is provided continuously, it is formed into an endless swath. If the transfer member 2 is provided intermittently, it is formed into swaths with ends divided into a plurality of segments. The respective segments can be arranged in an arc at an equal pitch on the outer peripheral surface of the transfer drum 41.

The transfer member 2 moves cyclically on the circular orbit by rotating the transfer drum 41. By the rotational phase of the transfer drum 41, the position of the transfer member 2 can be discriminated into a processing area R1 before discharge, a discharge area R2, processing areas R3 and R4 after discharge, a transfer area R5, and a processing area R6 after transfer. The transfer member 2 passes through these areas cyclically.

The processing area R1 before discharge is an area where preprocessing is performed on the transfer member 2 before the print unit 3 discharges ink and an area where the peripheral unit 5A performs processing. In this embodiment, a reactive liquid is applied. The discharge area R2 is a formation area where the print unit 3 forms an ink image by discharging ink to the transfer member 2. The processing areas R3 and R4 after discharge are processing areas where processing is performed on the ink image after ink discharge. The processing area R3 after discharge is an area where the peripheral unit 5B performs processing, and the processing area R4 after discharge is an area where the peripheral unit 5C performs processing. The transfer area R5 is an area where the transfer unit 4 transfers the ink image on the transfer member 2 to the print medium P. The processing area R6 after transfer is an area where post processing is performed on the transfer member 2 after transfer and an area where the peripheral unit 5D performs processing.

In this embodiment, the discharge area R2 is an area with a predetermined section. The other areas R1 and R3 to R6 have narrower sections than the discharge area R2. Comparing to the face of a clock, in this embodiment, the processing area R1 before discharge is positioned at almost 10 o'clock, the discharge area R2 is in a range from almost 11 o'clock to 1 o'clock, the processing area R3 after discharge is positioned at almost 2 o'clock, and the processing area R4 after discharge is positioned at almost 4 o'clock. The transfer area R5 is positioned at almost 6 o'clock, and the processing area R6 after transfer is an area at almost 8 o'clock.

The transfer member 2 may be formed by a single layer but may be an accumulative member of a plurality of layers. If the transfer member 2 is formed by the plurality of layers, it may include three layers of, for example, a surface layer, an elastic layer, and a compressed layer. The surface layer is an outermost layer having an image formation surface where the ink image is formed. By providing the compressed layer, the compressed layer absorbs deformation and disperses a local pressure fluctuation, making it possible to maintain transferability even at the time of high-speed printing. The elastic layer is a layer between the surface layer and the compressed layer.

As a material for the surface layer, various materials, such as a resin and a ceramic, can be used appropriately. With respect to durability, or the like, however, a material high in compressive modulus can be used. More specifically, an acrylic resin, an acrylic silicone resin, a fluoride-containing resin, a condensate obtained by condensing a hydrolyzable organosilicon compound, and the like, can be used. The surface layer that has undergone a surface treatment may be used in order to improve wettability of the reactive liquid, the transferability of an image, or the like. Frame processing, a corona treatment, a plasma treatment, a polishing treatment, a roughing treatment, an active energy beam irradiation treatment, an ozone treatment, a surfactant treatment, a silane coupling treatment, or the like, can be used as the surface treatment. A plurality of these treatments may be combined. It is also possible to provide an arbitrary surface shape in the surface layer.

For example, acrylonitrile-butadiene rubber, acrylic rubber, chloroprene rubber, urethane rubber, silicone rubber, or the like can be given as a material for the compressed layer. When such a rubber material is formed, a porous rubber material may be formed by blending a predetermined amount of a vulcanizing agent, vulcanizing accelerator, or the like and further blending a foaming agent, or a filling agent such as hollow fine particles or salt as needed. Consequently, a bubble portion is compressed along with a volume change with respect to various pressure fluctuations, and thus deformation in directions other than a compression direction is small, making it possible to obtain more stable transferability and durability. As the porous rubber material, there are a material having an open cell structure in which respective pores continue to each other and a material having a closed cell structure in which the respective pores are independent of each other. However, either structure may be used, or both of these structures may be used.

As a member for the elastic layer, the various materials, such as the resin and the ceramic, can be used appropriately. With respect to processing characteristics, various materials of an elastomer material and a rubber material can be used. More specifically, for example, fluorosilicone rubber, phenyl silicon rubber, fluorine rubber, chloroprene rubber, urethane rubber, nitrile rubber, and the like, can be used. In addition, ethylene propylene rubber, natural rubber, styrene rubber, isoprene rubber, butadiene rubber, the copolymer of ethylene/propylene/butadiene, nitrile-butadiene rubber, and the like, can be used. In particular, silicone rubber, fluorosilicone rubber, and phenyl silicon rubber are advantageous in terms of dimensional stability and durability because of their small compression set. They are also advantageous in terms of transferability because of their small elasticity change by a temperature.

Between the surface layer and the elastic layer and between the elastic layer and the compressed layer, various adhesives or double-sided adhesive tapes can also be used in order to fix them to each other. The transfer member 2 may also include a reinforce layer high in compressive modulus in order to suppress elongation in a horizontal direction or maintain resilience when attached to the transfer drum 41.

Woven fabric may be used as a reinforce layer. The transfer member 2 can be manufactured by arbitrarily combining the respective layers formed by the materials described above.

The outer peripheral surface of the pressurizing drum 42 is pressed against the transfer member 2. At least one grip mechanism which holds the leading edge portion of the print medium P is provided on the outer peripheral surface of the pressurizing drum 42. A plurality of grip mechanisms may be provided separately in the circumferential direction of the pressurizing drum 42. The ink image on the transfer member 2 is transferred to the print medium P when it passes through a nip portion between the pressurizing drum 42 and the transfer member 2 while being conveyed in tight contact with the outer peripheral surface of the pressurizing drum 42.

The transfer drum 41 and the pressurizing drum 42 share a driving source such as a motor that drives them. A driving force can be delivered by a transmission mechanism such as a gear mechanism.

<Peripheral Unit>

The peripheral units 5A to 5D are arranged around the transfer drum 41. In this embodiment, the peripheral units 5A to 5D are an application unit, an absorption unit, a heating unit, and a cleaning unit in order.

The application unit 5A is a mechanism which applies the reactive liquid onto the transfer member 2 before the print unit 3 discharges ink. The reactive liquid is a liquid that contains a component increasing an ink viscosity. An increase in ink viscosity here means that a coloring material, a resin, and the like that form the ink react chemically or suck physically by contacting the component that increases the ink viscosity, recognizing the increase in ink viscosity. This increase in ink viscosity includes not only a case in which an increase in viscosity of entire ink is recognized but also a case in which a local increase in viscosity is generated by coagulating some of components such as the coloring material and the resin that form the ink.

The component that increases the ink viscosity can use, without particular limitation, a substance such as metal ions or a polymeric coagulant that causes a pH change in ink and coagulates the coloring material in the ink, and can use an organic acid. For example, a roller, a printhead, a die coating apparatus (die coater), a blade coating apparatus (blade coater), or the like can be given as a mechanism which applies the reactive liquid. If the reactive liquid is applied to the transfer member 2 before the ink is discharged to the transfer member 2, it is possible to immediately fix ink that reaches the transfer member 2. This makes it possible to suppress bleeding caused by mixing adjacent inks.

The absorption unit 5B is a mechanism which absorbs a liquid component from the ink image on the transfer member 2 before transfer. It is possible to suppress, for example, a blur of an image printed on the print medium P by decreasing the liquid component of the ink image. Describing a decrease in liquid component from another point of view, it is also possible to represent it as condensing ink that forms the ink image on the transfer member 2. Condensing the ink means increasing the content of a solid content such as a coloring material or a resin included in the ink with respect to the liquid component by decreasing the liquid component included in the ink.

The absorption unit 5B includes, for example, a liquid absorbing member that decreases the amount of the liquid component of the ink image by contacting the ink image. The liquid absorbing member may be formed on the outer peripheral surface of the roller or may be formed into an endless sheet-like shape and run cyclically. In terms of protection of the ink image, the liquid absorbing member may be moved in synchronism with the transfer member 2 by making the moving speed of the liquid absorbing member equal to the peripheral speed of the transfer member 2.

The liquid absorbing member may include a porous body that contacts the ink image. The pore size of the porous body on the surface that contacts the ink image may be equal to or smaller than 10 µm in order to suppress adherence of an ink solid content to the liquid absorbing member. The pore size here refers to an average diameter and can be measured by a known means such as a mercury intrusion technique, a nitrogen adsorption method, or an SEM image observation. Note that the liquid component does not have a fixed shape, and is not particularly limited if it has fluidity and an almost constant volume. For example, water, an organic solvent, or the like contained in the ink or reactive liquid can be given as the liquid component.

The heating unit 5C is a mechanism which heats the ink image on the transfer member 2 before transfer. A resin in the ink image melts by heating the ink image, improving transferability to the print medium P. A heating temperature can be equal to or higher than the minimum film forming temperature (MFT) of the resin. The MFT can be measured by each apparatus that complies with a generally known method such as JIS K 6828-2: 2003 or ISO 2115: 1996. From the viewpoint of transferability and image robustness, the ink image may be heated at a temperature higher than the MFT by 10° C. or higher, or may further be heated at a temperature higher than the MFT by 20° C. or higher. The heating unit 5C can use a known heating device, for example, various lamps such as infrared rays, a warm air fan, or the like. An infrared heater can be used in terms of heating efficiency.

The cleaning unit 5D is a mechanism which cleans the transfer member 2 after transfer. The cleaning unit 5D removes ink remaining on the transfer member 2, dust on the transfer member 2, or the like. The cleaning unit 5D can use a known method, for example, a method of bringing a porous member into contact with the transfer member 2, a method of scraping the surface of the transfer member 2 with a brush, a method of scratching the surface of the transfer member 2 with a blade, or the like as needed. A known shape such as a roller shape or a web shape can be used for a cleaning member used for cleaning.

As described above, in this embodiment, the application unit 5A, the absorption unit 5B, the heating unit 5C, and the cleaning unit 5D are included as the peripheral units. However, some of these units may each be provided with the cooling function of the transfer member 2 or added with a cooling unit. In this embodiment, the temperature of the transfer member 2 may rise by heat of the heating unit 5C. If the ink image exceeds the boiling point of water as a prime solvent of ink after the print unit 3 discharges ink to the transfer member 2, performance of liquid component absorption by the absorption unit 5B may degrade. It is possible to maintain the performance of liquid component absorption by cooling the transfer member 2 such that the discharged ink is maintained below the boiling point of water.

The cooling unit may be an air blowing mechanism which blows air to the transfer member 2, or a mechanism which brings a member (for example, a roller) into contact with the transfer member 2 and cools this member by air-cooling or water-cooling. The cooling unit may be a mechanism which cools the cleaning member of the cleaning unit 5D. A cooling timing may be a period before application of the reactive liquid after transfer.

<Supply Unit>

The supply unit 6 is a mechanism which supplies ink to each printhead 30 of the print unit 3. The supply unit 6 may be provided on the rear side of the printing system 1. The supply unit 6 includes a reservoir TK that reserves ink for each kind of ink. Each reservoir TK may include a main tank and a sub tank. Each reservoir TK and a corresponding one of the printheads 30 communicate with each other by a liquid passageway 6a, and ink is supplied from the reservoir TK to the printhead 30. The liquid passageway 6a may circulate ink between the reservoirs TK and the printheads 30. The supply unit 6 may include, for example, a pump that circulates ink. A deaerating mechanism which deaerates bubbles in ink may be provided in the middle of the liquid passageway 6a or in each reservoir TK. A valve that adjusts the fluid pressure of ink and an atmospheric pressure may be provided in the middle of the liquid passageway 6a or in each reservoir TK. The heights of each reservoir TK and each printhead 30 in the Z direction may be designed such that the liquid surface of ink in the reservoir TK is positioned lower than the ink discharge surface of the printhead 30.

<Conveyance Apparatus>

The conveyance apparatus 1B is an apparatus that feeds the print medium P to the transfer unit 4 and discharges, from the transfer unit 4, the printed product P' to which the ink image is transferred. The conveyance apparatus 1B includes a feeding unit 7, a plurality of conveyance drums 8 and 8a, two sprockets 8b, a chain 8c, and a collection unit 8d. In FIG. 1, an arrow inside a view of each constituent element in the conveyance apparatus 1B indicates a rotation direction of the constituent element, and an arrow outside the view of each constituent element indicates a conveyance path of the print medium P or the printed product P'. The print medium P is conveyed from the feeding unit 7 to the transfer unit 4, and the printed product P' is conveyed from the transfer unit 4 to the collection unit 8d. The side of the feeding unit 7 may be referred to as an upstream side in a conveyance direction, and the side of the collection unit 8d may be referred to as a downstream side.

The feeding unit 7 includes a stacking unit where the plurality of print media P are stacked and a feeding mechanism which feeds the print media P one by one from the stacking unit to the uppermost conveyance drum 8. Each of the conveyance drums 8 and 8a is a rotating member that rotates about the rotation axis in the Y direction and has a cylindrical outer peripheral surface. At least one grip mechanism which holds the leading edge portion of the print medium P (or printed product P') is provided on the outer peripheral surface of each of the conveyance drums 8 and 8a. A gripping operation and release operation of each grip mechanism may be controlled such that the print medium P is transferred between the adjacent conveyance drums.

The two conveyance drums 8a are used to reverse the print medium P. When the print medium P undergoes double-sided printing, it is not transferred to the conveyance drum 8 adjacent on the downstream side but transferred to the conveyance drums 8a from the pressurizing drum 42 after transfer onto the surface. The print medium P is reversed via the two conveyance drums 8a and transferred to the pressurizing drum 42 again via the conveyance drums 8 on the upstream side of the pressurizing drum 42. Consequently, the reverse surface of the print medium P faces the transfer drum 41, transferring the ink image to the reverse surface.

The chain 8c is wound between the two sprockets 8b. One of the two sprockets 8b is a driving sprocket, and the other is a driven sprocket. The chain 8c runs cyclically by rotating the driving sprocket. The chain 8c includes a plurality of grip mechanisms spaced apart from each other in its longitudinal direction. Each grip mechanism grips the end of the printed product P'. The printed product P' is transferred from the conveyance drum 8 positioned at a downstream end to each grip mechanism of the chain 8c, and the printed product P' gripped by the grip mechanism is conveyed to the collection unit 8d by running the chain 8c, releasing gripping. Consequently, the printed product P' is stacked in the collection unit 8d.

<Post Processing Unit>

The conveyance apparatus 1B includes post processing units 10A and 10B. The post processing units 10A and 10B are mechanisms which are arranged on the downstream side of the transfer unit 4, and perform post processing on the printed product P'. The post processing unit 10A performs processing on the obverse surface of the printed product P', and the post processing unit 10B performs processing on the reverse surface of the printed product P'. For example, coating for the purpose of protection, glossiness, and the like of an image on the image printed surface of the printed product P' can be given as one of type processing contents. For example, liquid application, sheet welding, lamination, and the like can be given as coating contents.

<Inspection Unit>

The conveyance apparatus 1B includes inspection units 9A and 9B. The inspection units 9A and 9B are mechanisms which are arranged on the downstream side of the transfer unit 4, and inspect the printed product P'.

In this embodiment, the inspection unit 9A is an image capturing apparatus that captures an image printed on the printed product P' and includes an image sensor, for example, a CCD sensor, a CMOS sensor, or the like. The inspection unit 9A captures a printed image while a printing operation is performed continuously. Based on the image captured by the inspection unit 9A, it is possible to confirm a time-over change in tint or the like of the printed image and determine whether to correct image data or print data. In this embodiment, the inspection unit 9A has an imaging range set on the outer peripheral surface of the pressurizing drum 42 and is arranged to be able to partially capture the printed image immediately after transfer. The inspection unit 9A may inspect all printed images or may inspect the images every predetermined number of sheets.

In this embodiment, the inspection unit 9B is also an image capturing apparatus that captures an image printed on the printed product P' and includes an image sensor, for example, a CCD sensor, a CMOS sensor, or the like. The inspection unit 9B captures a printed image in a test printing operation. The inspection unit 9B can capture the entire printed image. Based on the image captured by the inspection unit 9B, it is possible to perform basic settings for various correction operations regarding print data. In this embodiment, the inspection unit 9B is arranged at a position to capture the printed product P' conveyed by the chain 8c. When the inspection unit 9B captures the printed image, it captures the entire image by temporarily stopping the run of the chain 8c. The inspection unit 9B may be a scanner that scans the printed product P'.

<Control Unit>

Figure 4:
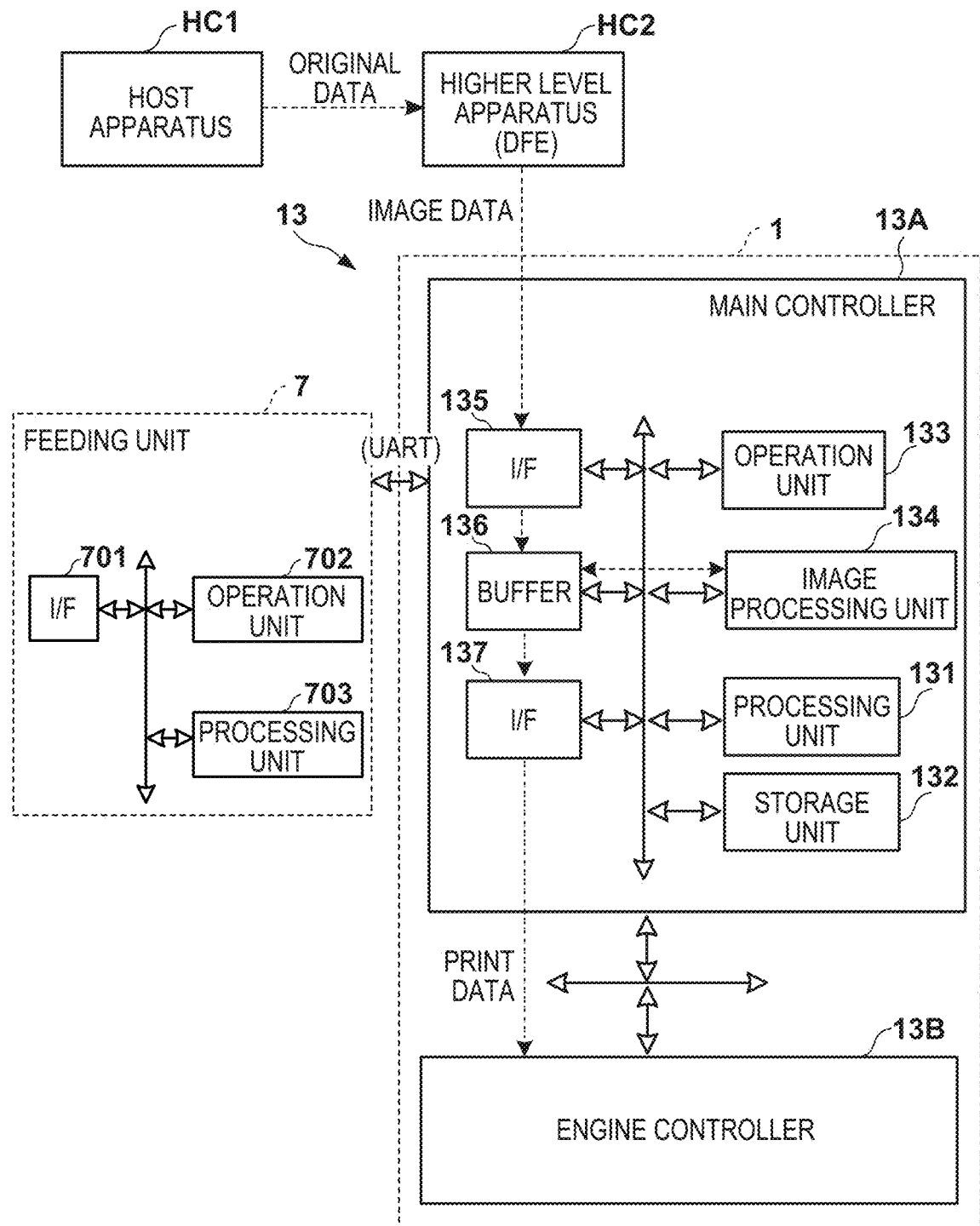
FIG. 4 is a block diagram showing a control system of the printing system in FIG. 1.
Figure 5:
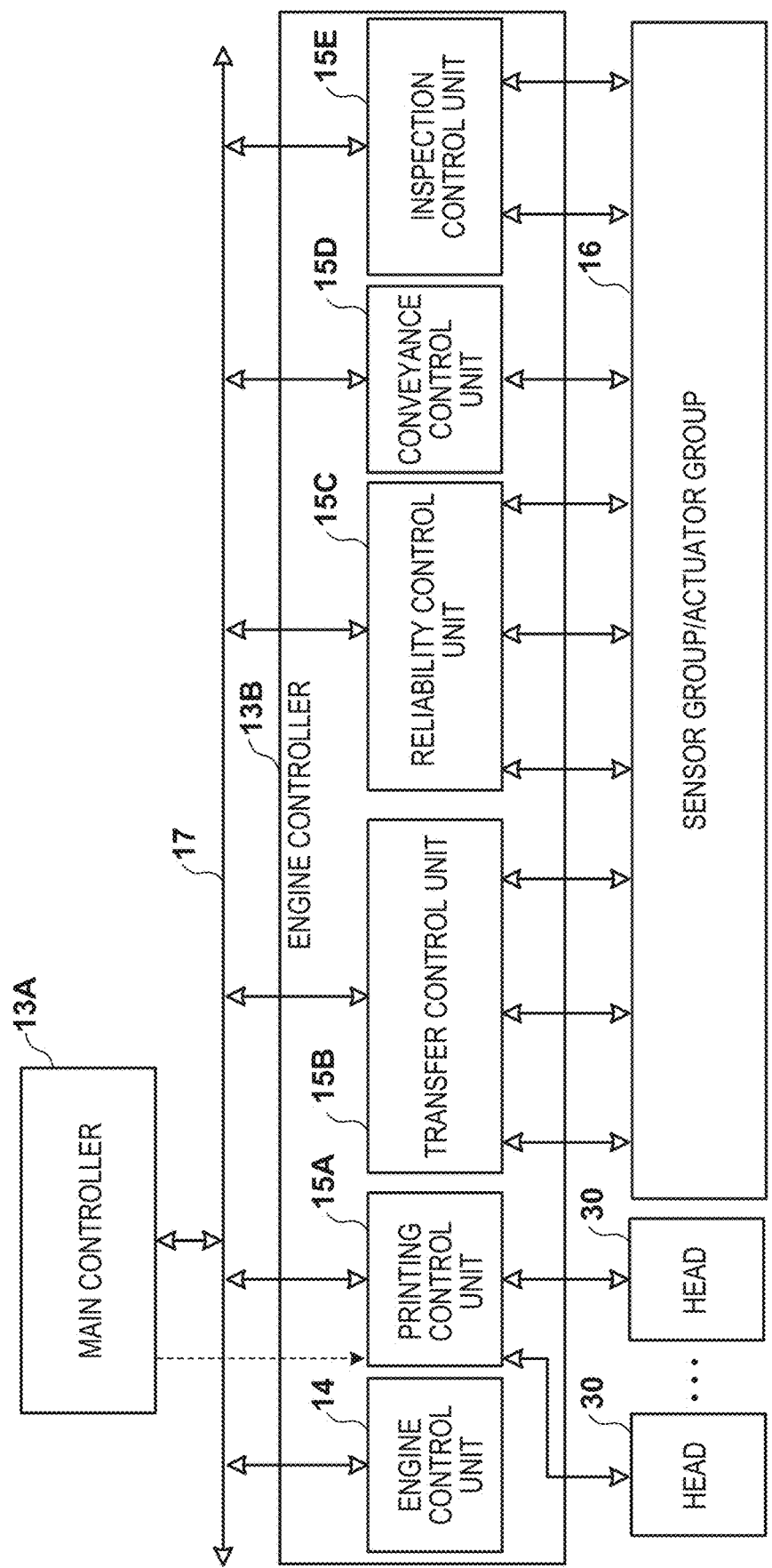
FIG. 5 is a block diagram showing the control system of the printing system in FIG. 1.

A control unit of the printing system 1 will be described next. FIGS. 4 and 5 are block diagrams each showing a control unit 13 of the printing system 1. The control unit 13 is communicably connected to a higher level apparatus (DFE) HC2, and the higher level apparatus HC2 is communicably connected to a host apparatus HC1.

Original data to be the source of a printed image is generated or saved in the host apparatus HC1. The original data here is generated in the format of, for example, an electronic file such as a document file or an image file. This original data is transmitted to the higher level apparatus HC2. In the higher level apparatus HC2, the received original data is converted into a data format (for example, RGB data that represents an image by RGB) available by the control unit 13. The converted data is transmitted from the higher level apparatus HC2 to the control unit 13 as image data. The control unit 13 starts a printing operation based on the received image data.

A main controller 13A is connected to the feeding unit 7 via a transmission path such as UART (Universal Asynchronous Receiver Transmitter). The feeding unit 7 includes, for example, a communication I/F (interface) 701 for performing communication with the main controller 13A, an operation unit 702 that accepts adjustment of a paper feed speed by a user operation, and a processing unit 703 that controls the feeding unit 7. The processing unit 703 controls paper feed to the conveyance apparatus 1B based on, for example, information acquired from the main controller 13A by the communication I/F 701 or user operation information accepted by the operation unit 702.

In this embodiment, the control unit 13 is roughly divided into the main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 is a processor such as a CPU, executes programs stored in the storage unit 132, and controls the entire main controller 13A. The storage unit 132 is a storage device such as a RAM, a ROM, a hard disk, or an SSD, stores data and the programs executed by the processing unit 131, and provides the processing unit 131 with a work area. The operation unit 133 is, for example, an input device such as a touch panel, a keyboard, or a mouse and accepts a user instruction.

The image processing unit 134 is, for example, an electronic circuit including an image processing processor. The buffer 136 is, for example, a RAM, a hard disk, or an SSD. The communication I/F 135 communicates with the higher level apparatus HC2, and the communication I/F 137 communicates with the engine controller 13B. In FIG. 4, broken-line arrows exemplify the processing sequence of image data. Image data received from the higher level apparatus HC2 via the communication I/F 135 is accumulated in the buffer 136. The image processing unit 134 reads out the image data from the buffer 136, performs predetermined image processing on the readout image data, and stores the processed data in the buffer 136 again. The image data after the image processing stored in the buffer 136 is transmitted from the communication I/F 137 to the engine controller 13B as print data used by a print engine. Note that the main controller 13A and the engine controller 13B can be connected to each other not only by the communication I/F 137 but also by an internal LAN 17. At this time, for example, a communication path used by the communication I/F 137 can be a communication path capable of performing large-capacity communication, that is used for transmission of print data. The internal LAN 17 can be a relatively low-capacity communication path for transmission of a control command and the like. Note that the internal LAN 17 may be formed by a communication interface with high reliability such that a predetermined command is transmitted at a predetermined timing with a high success probability.

As shown in FIG. 5, the engine controller 13B includes control units 14 and 15A to 15E, and acquires a detection result of a sensor group/actuator group 16 of the printing system 1 and performs driving control. Each of these control units includes a processor such as a CPU, a storage device such as a RAM or a ROM, and an interface with an external device. Furthermore, these control units can be interconnected via the internal LAN 17. These control units may be configured to communicate with each other using, for example, another communication path (not shown) without intervention of the internal LAN 17. Note that the division of the control units is an example, and a plurality of subdivided control units may perform some of control operations or conversely, the plurality of control units may be integrated with each other, and one control unit may be configured to implement their control contents.

The engine control unit 14 controls the entire engine controller 13B. The printing control unit 15A converts print data received from the main controller 13A into raster data or the like in a data format suitable for driving of the printheads 30. The printing control unit 15A controls discharge of each printhead 30.

The transfer control unit 15B controls the application unit 5A, the absorption unit 5B, the heating unit 5C, and the cleaning unit 5D.

The reliability control unit 15C controls the supply unit 6, the recovery unit 12, and a driving mechanism that moves the print unit 3 between the discharge position POS1 and the recovery position POS3.

The conveyance control unit 15D controls driving of the transfer unit 4 and controls the conveyance apparatus 1B. The inspection control unit 15E controls the inspection unit 9B and the inspection unit 9A.

Of the sensor group/actuator group 16, the sensor group includes a sensor that detects the position and speed of a movable part, a sensor that detects a temperature, and an image sensor. The actuator group includes a motor, an electromagnetic solenoid, and an electromagnetic valve.

<Operation Example>

Figure 6:
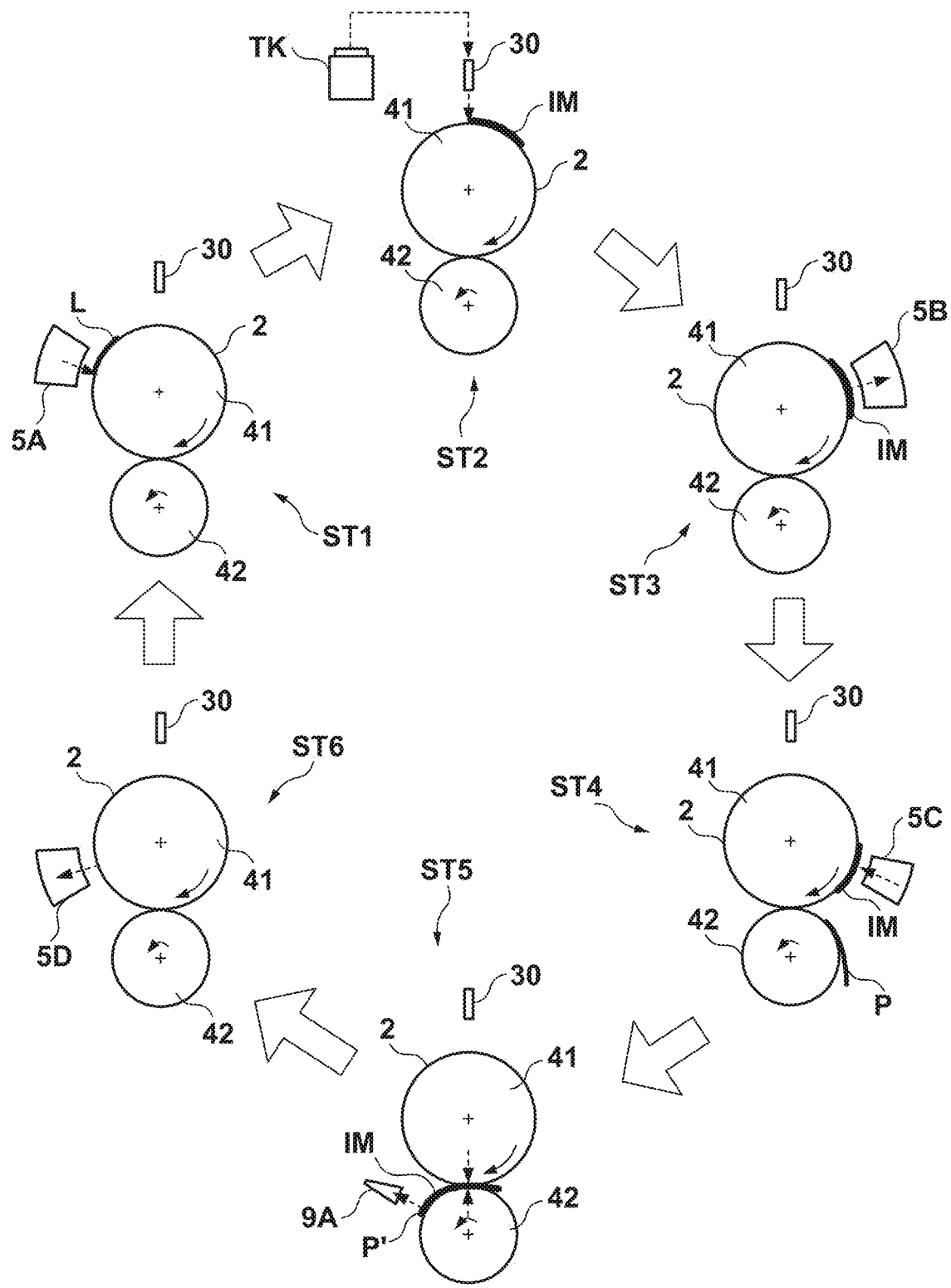
FIG. 6 is an explanatory view showing an example of the operation of the printing system in FIG. 1.

FIG. 6 is a view schematically showing an example of a printing operation. Respective steps below are performed cyclically while rotating the transfer drum 41 and the pressurizing drum 42. As shown in a state ST1, first, a reactive liquid L is applied from the application unit 5A onto the transfer member 2. A portion, on the transfer member 2, to which the reactive liquid L is applied moves along with the rotation of the transfer drum 41. When the portion to which the reactive liquid L is applied reaches under the printhead 30, ink is discharged from the printhead 30 to the transfer member 2, as shown in a state ST2. Consequently, an ink image IM is formed. At this time, the discharged ink mixes with the reactive liquid L on the transfer member 2, promoting coagulation of the coloring materials. The discharged ink is supplied from the reservoir TK of the supply unit 6 to the printhead 30.

The ink image IM on the transfer member 2 moves along with the rotation of the transfer member 2. When the ink image IM reaches the absorption unit 5B, as shown in a state ST3, the absorption unit 5B absorbs a liquid component from the ink image IM. When the ink image IM reaches the heating unit 5C, as shown in a state ST4, the heating unit 5C heats the ink image IM, a resin in the ink image IM melts, and a film of the ink image IM is formed. In synchronism with such formation of the ink image IM, the conveyance apparatus 1B conveys the print medium P.

As shown in a state ST5, the ink image IM and the print medium P reach the nip portion between the transfer member 2 and the pressurizing drum 42, the ink image IM is transferred to the print medium P, and the printed product P' is formed. Passing through the nip portion, the inspection unit 9A captures an image printed on the printed product P' and inspects the printed image. The conveyance apparatus 1B conveys the printed product P' to the collection unit 8d.

When a portion, on the transfer member 2, where the ink image IM is formed reaches the cleaning unit 5D, it is cleaned by the cleaning unit 5D, as shown in a state ST6. After the cleaning, the transfer member 2 rotates once, and transfer of the ink image to the print medium P is performed repeatedly in the same procedure. The description above has been given such that transfer of the ink image IM to one print medium P is performed once in one rotation of the transfer member 2 for easy understanding. It is possible, however, to continuously perform transfer of the ink image IM to the plurality of print media P in one rotation of the transfer member 2.

Figure 7:
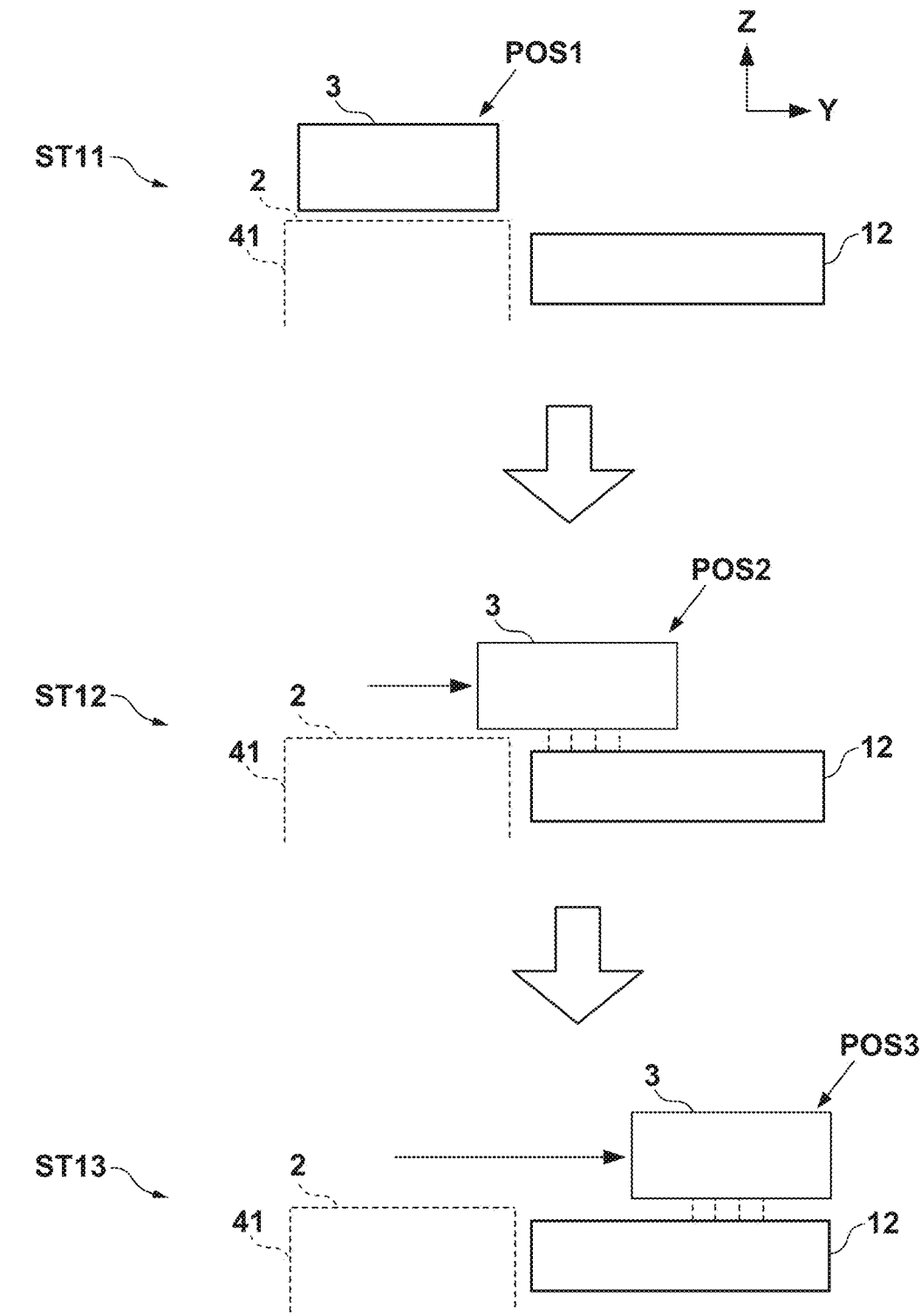
FIG. 7 is an explanatory view showing an example of the operation of the printing system in FIG. 1.

Each printhead 30 needs maintenance if such a printing operation continues. FIG. 7 shows an operation example at the time of maintenance of each printhead 30. A state ST11 shows a state in which the print unit 3 is positioned at the discharge position POS1. A state ST12 shows a state in which the print unit 3 passes through the preliminary recovery position POS2. Under passage, the recovery unit 12 performs a process of recovering discharge performance of each printhead 30 of the print unit 3. Subsequently, as shown in a state ST13, the recovery unit 12 performs the process of recovering the discharge performance of each printhead 30 in a state in which the print unit 3 is positioned at the recovery position POS3.

As described above, the printing system 1 according to this embodiment can continuously transfer the ink image IM to the plurality of print media P in one rotation of the transfer member 2. Note that the print medium P may be a cut sheet of paper or another medium obtained for each printing operation of one image. In this case, if it is possible to transfer an image to N print media P in one rotation of the transfer member 2, in order to transfer the image continuously, it is necessary to complete, for example, image processing within 1/N (to be referred to as a "unit transfer time" hereinafter) of the time required for one rotation of the transfer member 2. However, the time taken to perform image processing in the higher level apparatus HC2 and the main controller 13A may become longer than the unit transfer time. Consider, for example, a case in which when the higher level apparatus HC2 and the main controller 13A are designed to complete image processing for image data of 600 dpi within the unit transfer time, image data of 1,200 dpi is processed by these apparatuses. With respect to images of the same paper size, the processing amount of image processing for image data of 1,200 dpi is about four times larger than that for image data of 600 dpi. Thus, the processing time can increase up to about four times. Therefore, image processing for the image data of 1,200 dpi may take about four times the unit transfer time. In addition to the image processing, if the amount of image data increases, the processing time can increase in accordance with print conditions represented by the time taken to process image data. For example, a data transfer time is accordingly prolonged depending on a data transfer line.

In this case, if the transfer member 2, the conveyance apparatus 1B, and the like continue the printing operation, the print medium P to which the ink image IM is transferred and the print medium P to which no ink image IM is transferred are mixed and output, and thus the user needs to sort them. To the contrary, if the image processing and the like are not complete, the operations of the transfer member 2, the conveyance apparatus 1B, and the like can be stopped. If, for example, image processing and the like for one image data are not complete, the operations of the transfer member 2, the conveyance apparatus 1B, and the like are stopped. In an arrangement in which image processing and the like for image data of 600 dpi are completed within the unit transfer time, if the image processing and the like do not end within the unit transfer time since image data of 1,200 dpi is a print target, the operations of the transfer member 2, the conveyance apparatus 1B, and the like are stopped. This prevents the print medium P, to which no ink image IM is transferred, from being output. Note that if the same image is printed continuously, printing processing can be executed continuously regardless of the resolution of the image data. This is because once the image processing and the like are performed, the same processing need not be performed for subsequent image data. For example, if an image of 600 dpi is printed after printing the same image of 1,200 dpi on four sheets in an arrangement in which four sheets can be printed in one rotation of the transfer member 2, all these printing operations can be performed continuously. That is, the image processing and the like for the image data of 1,200 dpi are complete at the time of printing of the first sheet in the first rotation, and the second to fourth sheets can be printed using the result of the image processing and the like. Since the image processing and the like for the subsequent image data of 600 dpi are completed within the unit transfer time, it is possible to print the image data of 600 dpi by printing of the first sheet in the second rotation. If there is no section where no printing is executed, it is unnecessary to stop the operations of the transfer member 2, the conveyance apparatus 1B, and the like. Note that if the operations of the transfer member 2, the conveyance apparatus 1B, and the like are stopped, the activation processing of the transfer member 2, the conveyance apparatus 1B, and the like is executed when the image processing and the like for the next print target image advances to a printable state, and thus the load and time for controlling the activation processing can be required.

Furthermore, for example, the rotation speed of the transfer member 2 and the conveyance speed of the print medium P by the conveyance apparatus 1B can be decreased. For example, for image data that takes a processing time which is N times longer than the unit transfer time, the rotation speed and the conveyance speed are set to 1/N. Assume, for example, that if image data of 1,200 dpi is printed in an arrangement capable of printing image data of 600 dpi continuously at a linear velocity of 0.6 m/s, the image processing and the like take four times longer. In this case, the rotation speed and the conveyance speed can be decreased to 0.15 m/s, thereby executing printing. This can execute printing processing in accordance with the speed of the image processing and the like. Note that in this case, various parameters need to be set appropriately in accordance with the decrease in rotation speed. If printing is executed under the condition that image data of 1,200 dpi and image data of 600 dpi are mixed, the image data of 600 dpi is also printed at a linear velocity according to the image data of 1,200 dpi.

Furthermore, it is possible to control the number of copies in one rotation of the transfer member 2 by processing of scheduling formation of the ink image on the transfer member 2 and conveyance of the print medium P by the conveyance apparatus 1B and thinning out the formation of the ink image and conveyance of the print medium P. That is, in a state in which the rotation speed of the transfer member 2 and the conveyance speed of the print medium P by the conveyance apparatus 1B are maintained constant and the image processing and the like are not complete, control is performed not to form the ink image on the transfer member 2 and not to convey the print medium P. If, for example, printing of image data of 1,200 dpi is scheduled, it is estimated that the image processing and the like take four times as long as the time taken for image data of 600 dpi, thereby executing printing during one of four periods in which image data can be printed. For example, if four image data can be printed in one rotation of the transfer member 2, an ink image is formed not in areas, on the transfer member 2, corresponding to the first to third sheets but in an area corresponding to the fourth sheet. Furthermore, the conveyance apparatus 1B does not convey the paper at timings corresponding to the first to third sheets but conveys the paper at a timing corresponding to the fourth sheet. This can execute printing processing appropriately in accordance with the speed of the image processing and the like without changing the settings of various parameters in the transfer member 2, the conveyance apparatus 1B, and the like and without decreasing the print speed. In this embodiment, the following description will be provided by, particularly, paying attention to this method.

Figure 8:
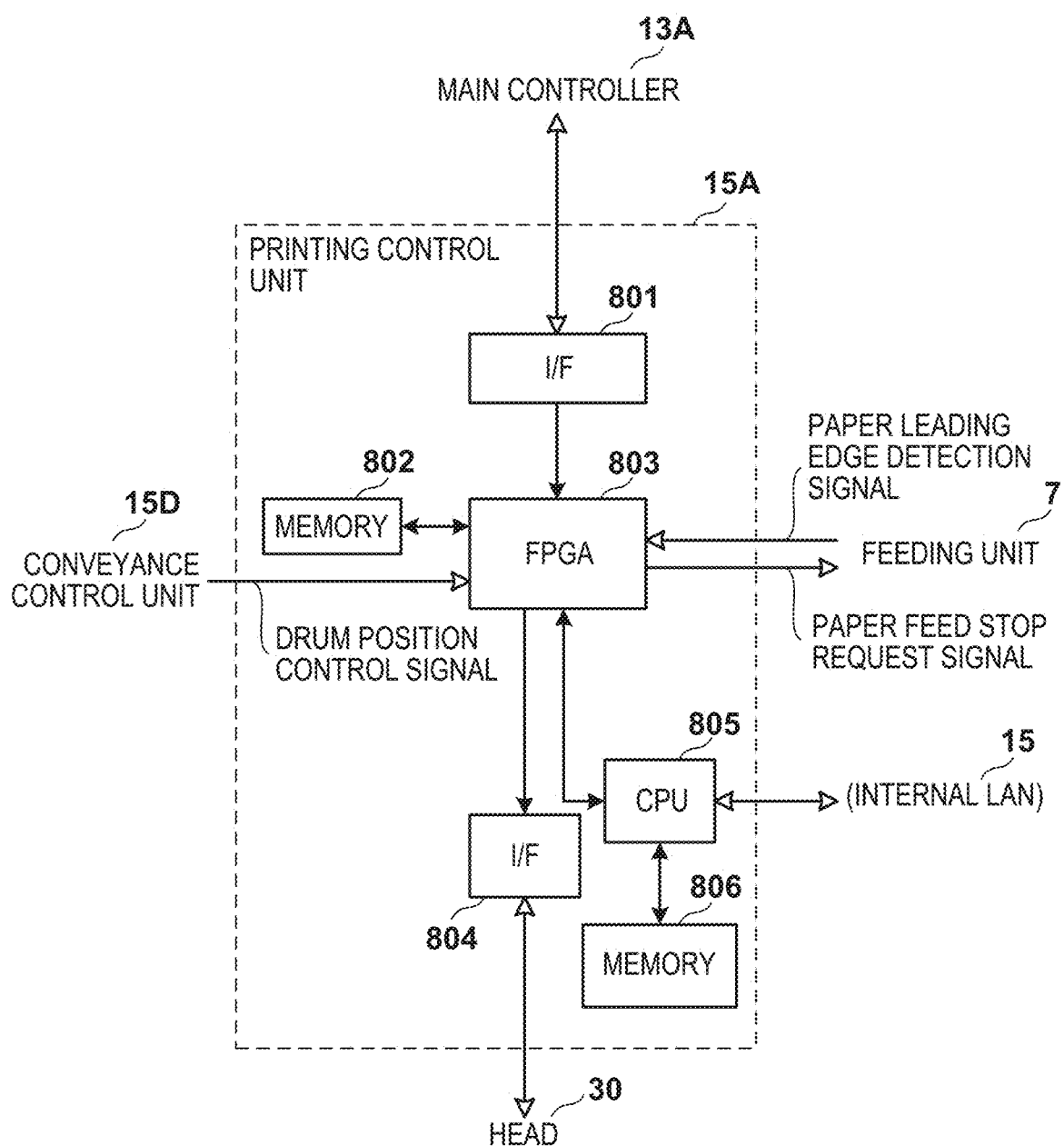
FIG. 8 is a block diagram showing an example of the arrangement of a printing control unit.
Figure 10:
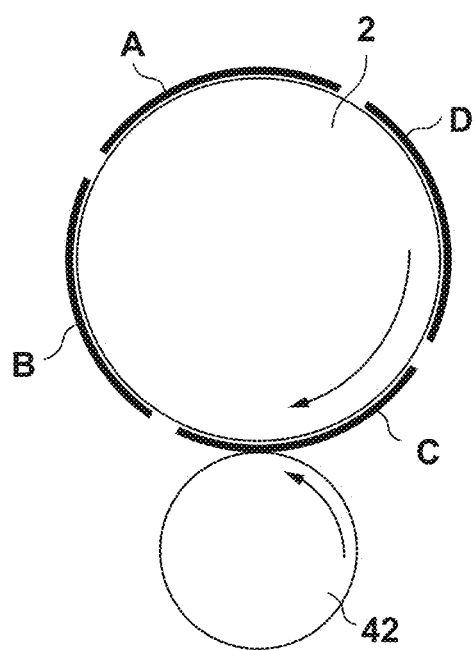
FIG. 10 is a view for explaining the structure of a transfer member.

In this embodiment, in an example, the printing control unit 15A executes processing for controlling the number of copies in one rotation of the transfer member 2 based on a print condition such as a resolution indicating the time taken to process image data. An example of the arrangement of the printing control unit 15A will be described with reference to FIG. 8. The printing control unit 15A includes, for example an FPGA (Field Programmable Gate Array) 803 and a CPU 805. For example, the FPGA 803 receives, via a communication I/F 801, print data received from the main controller 13A, and accumulates it in a memory 802. The FPGA 803 controls the printheads 30 via a communication I/F 804 to discharge ink to the transfer member 2 at a timing based on a drum position control signal from the conveyance control unit 15D after performing various image processes for the print data accumulated in the memory 802. That is, the FPGA 803 specifies a rotation amount from the reference position of the transfer member 2 of the transfer drum 41 and the like by the drum position control signal, and controls an ink discharge timing so as to print a predetermined image at a predetermined position on the print medium P. In this embodiment, assume that four image data are printed in one rotation of the transfer member 2. As shown in FIG. 10, the transfer member 2 includes four areas A to D, around each of which a transfer component (blanket) on which the ink image is formed is wound. At this time, each area has a length in the circumferential direction of the drum of the transfer member 2, that corresponds to the length of the cut sheet usable for printing. Thus, the transfer member 2 has a drum diameter (peripheral length) determined in accordance with the length of the cut sheet usable for printing. The FPGA 803 can control a specific one of the four surfaces, on which printing is to be executed, by the drum position control signal. Note that the number of sheets printable in one rotation of the transfer member 2 need not be four but may be a predetermined number such as two, three, or five or more. The FPGA 803 also controls ink discharge of each printhead 30 and paper feed of feeding unit 7. For example, the FPGA 803 can control the paper feed by transmitting a paper feed stop request signal to the feeding unit 7 at a timing when the paper feed should be stopped. The feeding unit 7 can execute the paper feed unless, for example, such signal is received. Note that the FPGA 803 may be configured to transmit a paper feed request signal at a timing when paper should be fed, and not to transmit such signal at a timing when paper should not be fed. The FPGA 803 can control execution of printing on the print medium using a specific area on the transfer member 2 by synchronizing, with the paper feed timing, a timing when printing is executed in a specific area on the transfer member 2.

The FPGA 803 can execute various processes based on instructions from the CPU 805. The CPU 805 is connected to the internal LAN 17 to receive a control command or the like from another control unit and transmit a control command or the like to another control unit. The CPU 805 is connected to a memory 806 to execute processing in accordance with various control commands or the like using, for example, the memory 806 as a working memory. For example, the CPU 805 can generate, based on information of the print condition such as a resolution concerning print target image data acquired from the main controller 13A, a schedule to be used to actually execute printing, and notify the FPGA 803 of information about the schedule. The information of the print condition such as a resolution concerning the image data can be added, in a form of a header, to the values of pixels forming the image. The schedule used to execute printing may be in a form of a POT (Print Order Table) (to be described later). Furthermore, for example, an output resolution is decided based on an instruction from the user when inputting original data to the higher level apparatus (DFE) HC2, and information of the resolution and information of the number of copies are sent to the printing control unit 15A first. Then, the printing control unit 15A can generate a schedule based on these pieces of information. Thus, since the main controller 13A transfers print data to the printing control unit 15A, it is possible to generate a schedule on which the time taken for the DFE and the main controller 13A to process the data is reflected. Note that the main controller 13A may generate the above-described schedule based on the print condition of the print target image data, and the CPU 805 may acquire information of the generated schedule. The CPU 805 or the main controller 13A can generate the schedule by reflecting one of the time taken for the DFE to process the original data and the time taken for the main controller 13A to process the data. Alternatively, the CPU 805 or the main controller 13A can generate the schedule in accordance with both the processing times. Furthermore, in addition to or instead of this, the CPU 805 or the main controller 13A may generate a schedule based on a time interval at which the feeding unit 7 conveys the print medium. Based on the schedule sent from the CPU 805, the FPGA 803 executes control not to feed paper or discharge ink at a timing when no printing is executed and to feed paper and discharge ink only at a timing when printing is executed due to the schedule. This can prevent, when image processing is not complete for, for example, image data of a high resolution in accordance with the print condition, the print medium, to which no ink image is transferred, from being conveyed, or printing processing from failing. Furthermore, the FPGA 803 may control to discharge ink, for example, only when the feeding unit 7 receives a paper leading edge detection signal indicating that the leading edge of paper (print medium P) has been detected, that is, only when the print medium P is actually conveyed. This can prevent the ink image from being unnecessarily formed on the transfer member 2 when, for example, conveyance of the print medium P fails due to being out of paper or the like even at a timing when the feeding unit 7 should convey the print medium P. In addition, no ink image is formed on the transfer member 2, thereby making it possible to prevent ink from adhering to, for example, the pressurizing drum 42.

Note that the printing control unit 15A may be connected to the conveyance control unit 15D and the feeding unit 7 via, for example, the internal LAN 17, but may be connected to these functional units using dedicated lines. The printing control unit 15A includes the FPGA 803. However, the FPGA 803 may be replaced by another processor such as an ASIC (Application Specific Integrated Circuit) or DSP (Digital Signal Processor).

Figure 9:
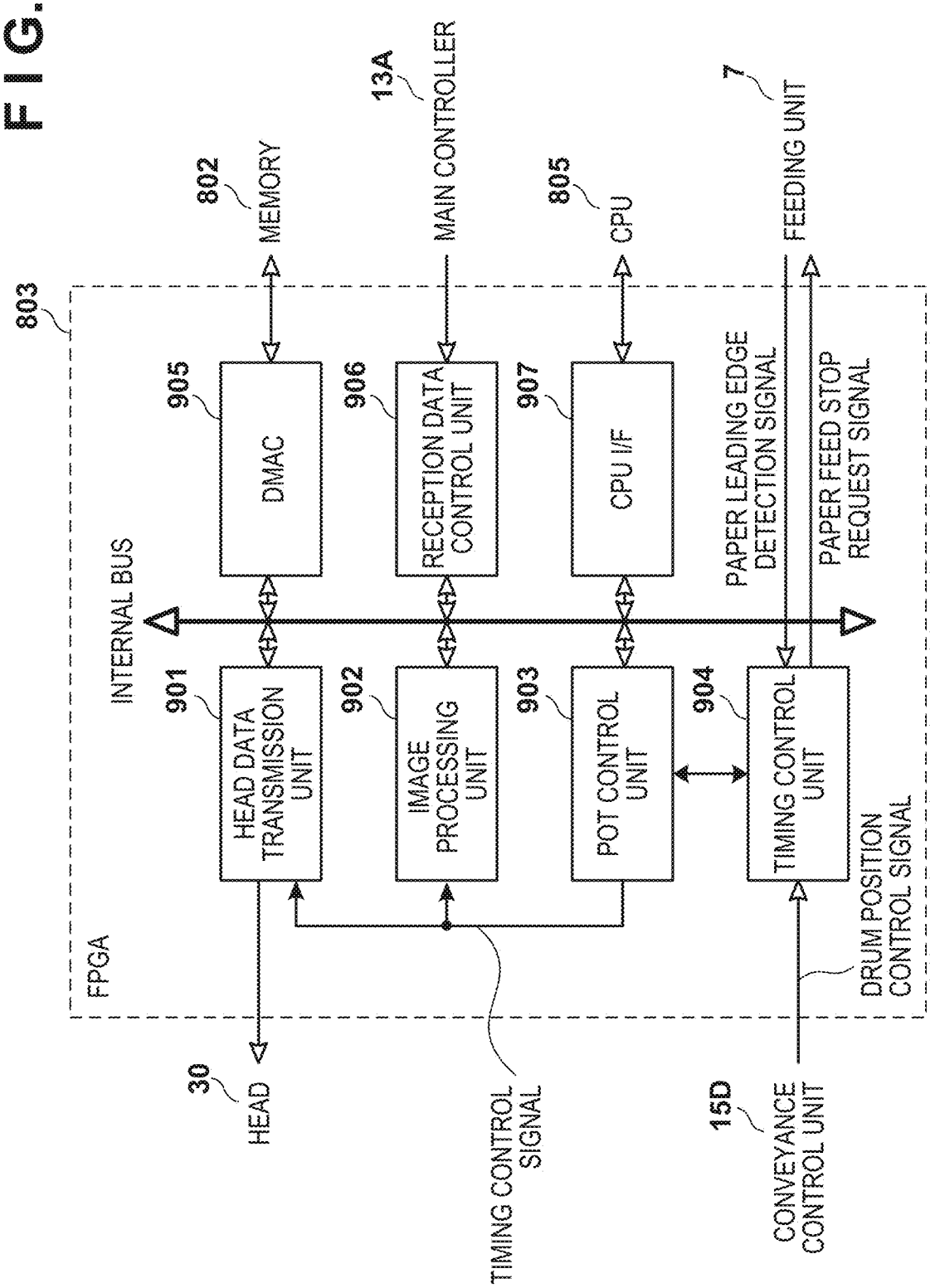
FIG. 9 is a block diagram showing an example of a functional arrangement implemented in the printing control unit.

FIG. 9 shows an example of a functional arrangement implemented by the FPGA 803. The FPGA 803 is configured to include the functions of a head data transmission unit 901, image processing unit 902, POT control unit 903, timing control unit 904, DMAC 905, reception data control unit 906, and CPU I/F 907. The FPGA 803 causes the reception data control unit 906 to acquire print data from the main controller 13A and accumulate it. The reception data control unit 906 activates the DMAC 905 in accordance with accumulation of data of an amount that can be written in the memory 802, causing the DMAC 905 to write the accumulated data in the memory 802. The POT control unit 903 acquires a print order table (POT) indicating a print schedule from the CPU 805 via the CPU I/F 907 serving as an interface with the CPU 805.

FIG. 11 shows an example of the POT. As shown in FIG. 11, the POT is a table that associates the print ordinal number of each image with the number of copies of the image. In the POT shown in FIG. 11, after N copies of image 1 are printed, one copy of image 2 is printed. After that, N copies of image 3, one copy of image 4, one copy of image 5, one copy of image 3, and one copy of image G are printed, thereby ending printing. Note that if the POT control unit 903 acquires another POT while executing printing processing in accordance with the POT shown in FIG. 11, it can add a print schedule included in the acquired POT to the end of the current POT. The POT control unit 903 causes the image processing unit 902 to execute each image processing for allowing printing by the ink image of the print target image in accordance with the POT, and causes the head data transmission unit 901 to control the printheads 30 so as to form an ink image according to the processed image on the transfer member 2. For example, the POT control unit 903 loads the first row of the POT to set image 1 as a print target, and transmits a timing control signal to the image processing unit 902 so as to start image processing related to the print target image before forming the ink image on the transfer member 2. The POT control unit 903 transmits a timing control signal to the head data transmission unit 901 to form, at an appropriate position on the transfer member 2, an ink image related to the image having undergone the image processing. Note that the POT control unit 903 may transmit one timing control signal to both the head data transmission unit 901 and the image processing unit 902. In this case, for example, the image processing unit 902 can start the processing immediately after the signal is received, and the head data transmission unit 901 can transmit a signal for controlling each printhead 30 to discharge ink after a predetermined time elapses since the signal is received. The POT control unit 903 transmits a timing control signal to the head data transmission unit 901 so as to print N copies of image 1. After that, the POT control unit 903 loads the second row of the POT to set image 2 as a print target, and transmits a timing control signal to each of the head data transmission unit 901 and the image processing unit 902.

The timing control unit 904 can receive the drum position control signal from the conveyance control unit 15D, and provide the POT control unit 903 with information as the reference of the timing of the processing for executing ink image formation processing. For example, the POT control unit 903 generates the above-described timing control signal based on the timing provided from the timing control unit 904.

In this example, for example, if the higher level apparatus HC2 and the main controller 13A are designed to complete image processing for image data of 600 dpi within the unit transfer time, image data of 600 dpi can be sequentially printed in accordance with the POT shown in FIG. 11. At this time, the ink image can be formed using the transfer member 2 in an order of areas A, B, C, and D. However, if long time is required for image processing such as printing of image data of 1,200 dpi, the image processing is incomplete at a print timing. In accordance with the POT shown in FIG. 11, for example, the print medium is only conveyed without transferring the ink image.

Therefore, in this embodiment, contents of the POT are set based on the print condition such as a resolution. For example, if the image processing and the like for image data of 1,200 dpi take four times the unit transfer time, information indicating that there is no print target data in three of the four unit transfer times is included in the POT. Then, the POT control unit 903 transmits the timing control signal to each of the head data transmission unit 901 and the image processing unit 902 so as to print data for which the image processing and the like are complete during the periods in which it is indicated that there is no data.

FIG. 12 shows an example of the POT in this case. The example of FIG. 12 shows a case in which images 2 to 4 are images of 1,200 dpi and the remaining images are images of 600 dpi in the arrangement designed to complete image processing for image data of 600 dpi within the unit transfer time. Note that in this example, the image processing and the like for the image of 1,200 dpi end within four times the unit transfer time. In the example of FIG. 12, with respect to, for example, image 2 of 1,200 dpi, "Non" indicating that there is no print target for "three" successive print media is included in the POT and, after that, information about image 2 is included in the POT. That is, in this POT, a period taken to prepare to print image 2 of 1,200 dpi is expressed using a value "Non", and information indicating the period is expressed using a value "3" as the number of copies printable if printing is actually executed. Thus, the POT control unit 903 controls the printheads 30 to stop the formation of the ink image without stopping the rotation of the transfer member 2 based on the time taken to perform predetermined processing such as image processing with respect to printing of an image with 1,200 dpi as the print condition. Furthermore, the POT control unit 903 controls the feeding unit 7 to stop the supply of the print medium without stopping each drum associated with conveyance of the print medium based on the time taken to perform predetermined processing such as image processing. This can change the number of copies in accordance with the print condition, thereby preventing an event of, for example, conveying only the print medium from occurring. Similarly, with respect to image 3 of 1,200 dpi as well, "Non" indicating that there is no print target for "three" successive print media is included in the POT and, after that, information about image 3 is included in the POT. If two copies of image 3 are printed, it is unnecessary to execute the image processing and the like again in the stage of printing processing of the second copy, and thus processing associated with the next image data can start. Therefore, for example, by starting image processing and the like for image 4 at the time of the printing processing of the second copy of image 3, "Non" indicating that there is no print target for "two" successive print media is included in the POT with respect to image 4 and, after that, information about image 4 is included in the POT. Note that the printing processing of the second copy of image 3 and the image processing and the like of image 4 need not be parallelly performed, and the image processing and the like of image 4 may start after the end of the printing processing of image 3. In this case, "Non" indicating that there is no print target for "three" successive print media is included in the POT and, after that, information about image 4 is included in the POT. Note that for example, upon reading out "Non" from the POT, the POT control unit 903 can perform a readout operation from the POT with respect to the image of the next print target, and send the timing control signal to the image processing unit 902 so as to execute image processing. The POT control unit 903 can stand by until the period of "Non" elapses, and send the timing control signal to the head data transmission unit 901 so as to form the ink image on the transfer member 2 in accordance with the timing of printing the image of the next print target.

Figure 17:
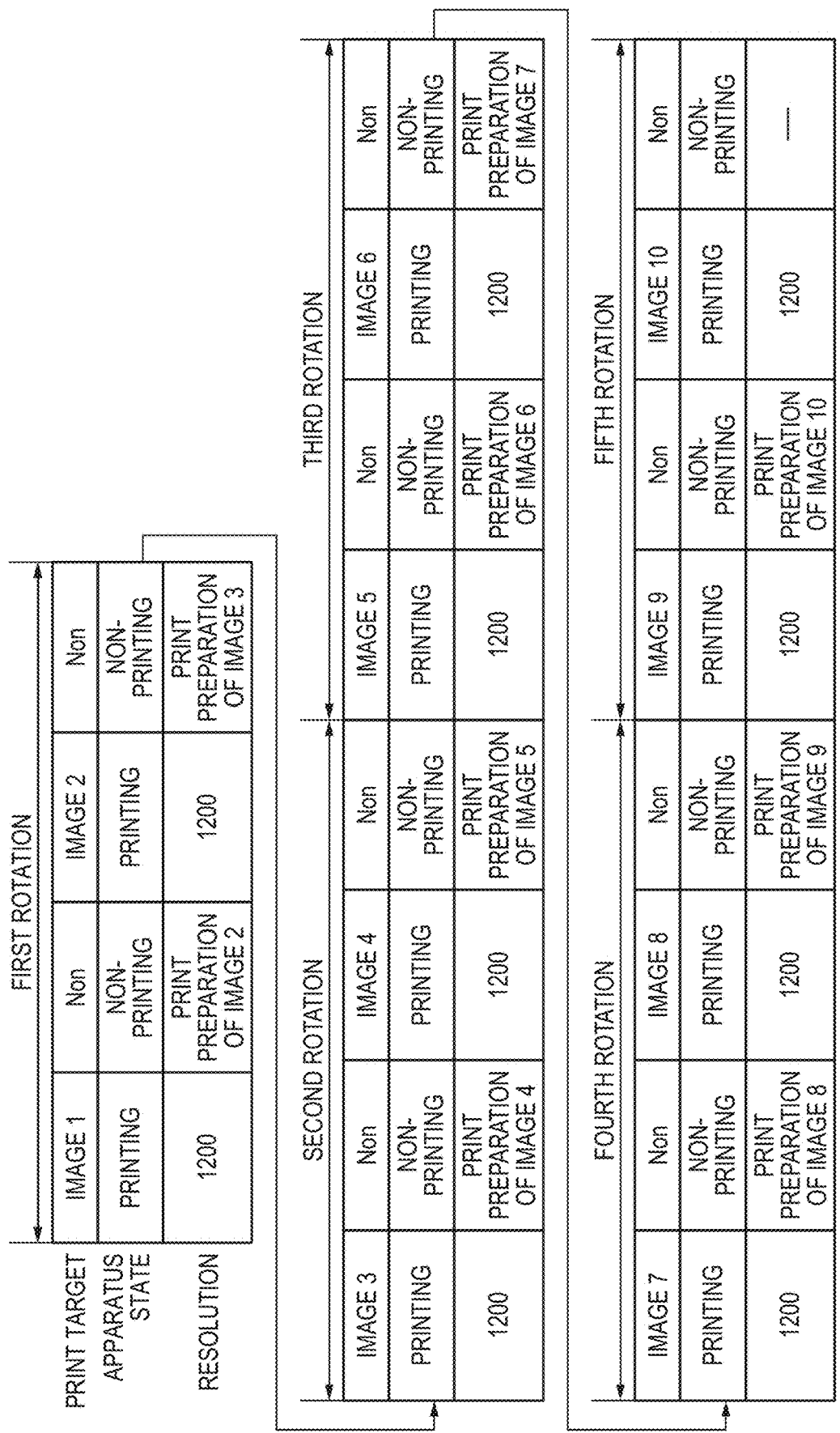
FIG. 17 is a view showing an example of processing executed by the printing system.

If, for example, the number of print media printable in one rotation of the transfer member is an integer multiple of the number of images printable in accordance with the image processing and conveyance property, only some of the areas of the transfer member where printing can be executed are used for printing at high frequencies. This state will be described with reference to FIGS. 13A to 13E. Note that in an example shown in FIGS. 13A to 13E, the image processing and the like for the image of 1,200 dpi end within twice the unit transfer time. FIGS. 13A to 13E show two POTs (FIGS. 13A and 13C) related to two print jobs. A job in FIG. 13A will be referred to as job 1 hereinafter and a job in FIG. 13C will be referred to as job 2 hereinafter. Note that during a period between jobs, for example, between jobs 1 and 2, paper feed is stopped. FIG. 17 shows an example of processing of job 1 when the POT shown in FIG. 13A is used. As shown in FIG. 17, image 1 of 1,200 dpi is printed on the first sheet in the first rotation. Since there is a delay caused by image processing for generating data for forming an ink image of image 2, "Non" is set for a period for the image processing and the like, that is, the period of the second sheet in the first rotation. After that, image 2 is printed on the third sheet in the first rotation. Since image 3 is also an image of 1,200 dpi, "Non" is set for the period of the fourth sheet in the first rotation as a period for image processing and the like, and image 3 is printed on the first sheet in the second rotation. Similarly, images 4 to 10 are printed.

Assume that the job is controlled so that printing starts in area A among areas A to D of the transfer member 2 shown in FIG. 10. FIGS. 13B and 13D show the use counts of areas A to D when jobs 1 and 2 are executed, respectively. FIG. 13E shows the use counts of areas A to D in printing processing at the end of execution of jobs 1 and 2. It is found from FIG. 13E that only areas A and C are used for printing as a result of executing the jobs shown in FIGS. 13A and 13C. As a result, only each of areas A and C contacts the print medium conveyed between the area and the pressurizing drum 42, and each of areas B and D does not contact the print medium. If the print medium contacts the transfer member 2, a component in the obverse layer of the transfer member 2 may degrade due to pressure at the time of transfer or shear caused by the difference between the conveyance speed of the print medium and the rotation speed of the transfer member 41. Consequently, in the example of FIGS. 13A to 13E, it is considered that degradation of components only in areas A and C of the transfer member 2 progresses, as compared with the remaining areas (areas B and D).

In this embodiment, therefore, degradation of components in the respective areas is made to equally progress by managing the use counts of areas A to D of the transfer member 2 for printing or the paper feeding counts for the areas and controlling these counts to be almost equal to each other. Embodiments of such control will be described below.

(First Embodiment)

FIGS. 14A to 14E show examples of POTs according to this embodiment. FIGS. 14A and 14C show POTs related to jobs 1 and 2, respectively. FIGS. 14B and 14D show the use counts of areas A to D when jobs 1 and 2 are executed, respectively. FIG. 14E show total counts. In this embodiment, as shown in FIGS. 14A and 14C, among areas A to D of a transfer member 2, different areas are used for jobs 1 and 2 at the start of printing. That is, in job 1, as a result of starting printing from area A, only areas A and C are used. Therefore, by starting printing from area B in job 2, areas B and D are used. For example, at the end of printing of job 1, a print count in each area of the transfer member 2 is stored in a storage unit 132 from a printing control unit 15A via a main controller 13A. Before starting job 2, the main controller 13A decides an area with a small print count as an area in which printing starts, and the printing control unit 15A and a conveyance control unit 15D control a print surface and paper feed timing so as to execute printing in the area with the small print count. According to this control processing, as shown in FIG. 14E, the difference in print count among the areas of the transfer member 2 is eliminated, thereby making it possible to prevent the components only in some areas from degrading significantly.

Figure 15:
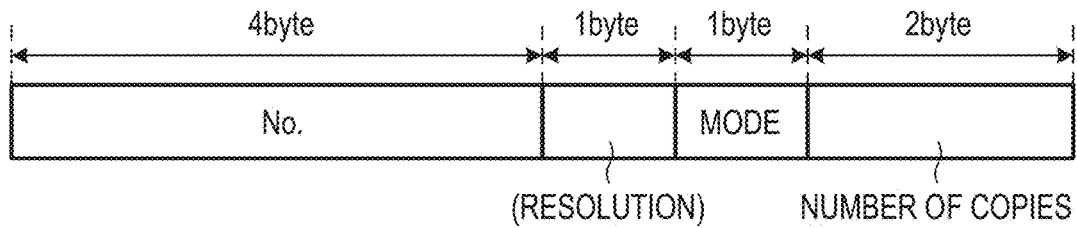
FIG. 15 is a view showing an example of the structure of information included in the print order table.

Note that each of the POTs shown in FIGS. 12 to 14E may include print condition information such as resolution information, as shown in FIG. 15. Each of the POTs shown in FIGS. 12 to 14E stores print target data in, for example, a structure shown in FIG. 15. FIG. 15 shows an example of the structure of one print target data. As shown in FIG. 15, for example, the serial number of the print target is expressed in four bytes, a mode is expressed in one byte, and the number of copies is expressed in two bytes. In the case of FIGS. 14A to 14E, information indicating the resolution is expressed in, for example, one byte. Note that a value associated with each state is stored in the "mode". For example, "0x01" for a case in which there is a print target, "0x02" for a case in which there is no print target but printing does not end, that is, "Non" is included, and "0x00" for a case in which the printing processing ends are stored. Furthermore, in the "resolution", "0x01" is stored for 600 dpi, "0x02" is stored for 1,200 dpi, and "0x00" is stored for 0 corresponding to a case in which the mode is "Non" or "end". Note that another value may be used as the value of the resolution. In this case, a value except for 0x00 to 0x02 is used as a value indicating the resolution.

An example of the sequence of the printing processing executed in accordance with the POTs shown in FIGS. 14A to 14E will be described with reference to FIG. 16. This processing starts due to various factors such as power-on of the printing system, execution of a processing start operation, and occurrence of a print job. If the processing starts, the main controller 13A reads out the paper feeding count for each print area (step S1601), and sets the print area with a small paper feeding count as an area to be used at the start of printing (step S1602). For example, when job 1 ends, the accumulated paper feeding counts for areas A, B, C, and D are 5, 0, 5, and 0, respectively. Thus, at the start of job 2, the main controller 13A decides to start printing from area B with a small paper feeding count. The printing control unit 15A sets a POT through the main controller 13A (step S1603). Then, the main controller 13A or the printing control unit 15A outputs a control command to another control unit via, for example, an internal LAN 17 to start rotation of drums (step S1604), and then starts printing processing according to the POT set in step S1603 (step S1605). At this time, the printing control unit 15A and the conveyance control unit 15D control the print surface and paper feed timing so as to start printing from the area decided in step S1602. Note that if the drums already rotate before the processing of FIG. 16 (or the processing in step S1604), the processing in step S1604 is skipped. After the start of the printing processing, the printing processing continues until all jobs end (until YES is determined in step S1606). If the POT is updated by new information concerning a job or the like before all the jobs end (NO in step S1606), the current POT is updated or replaced by the new POT, thereby resetting the POT (step S1607). As shown in FIG. 14E, the above processing eliminates the difference in use count for printing among the areas of the transfer member 2, thereby making it possible to suppress degradation from progressing only in some areas.

In this printing processing, even if there is a job with a large delay caused by image processing and the like of data of 1,200 dpi, the rotation of the drums is not stopped, as described above. However, in accordance with the POT, during the period of "Non" corresponding to a period until the image processing and the like associated with the job are completed, no ink image is formed and no print medium P is conveyed. This eliminates the need to start initial processing such as a start of drum rotation upon completion of the above-described processing or the like since the entire system is stopped.

Figure 16:
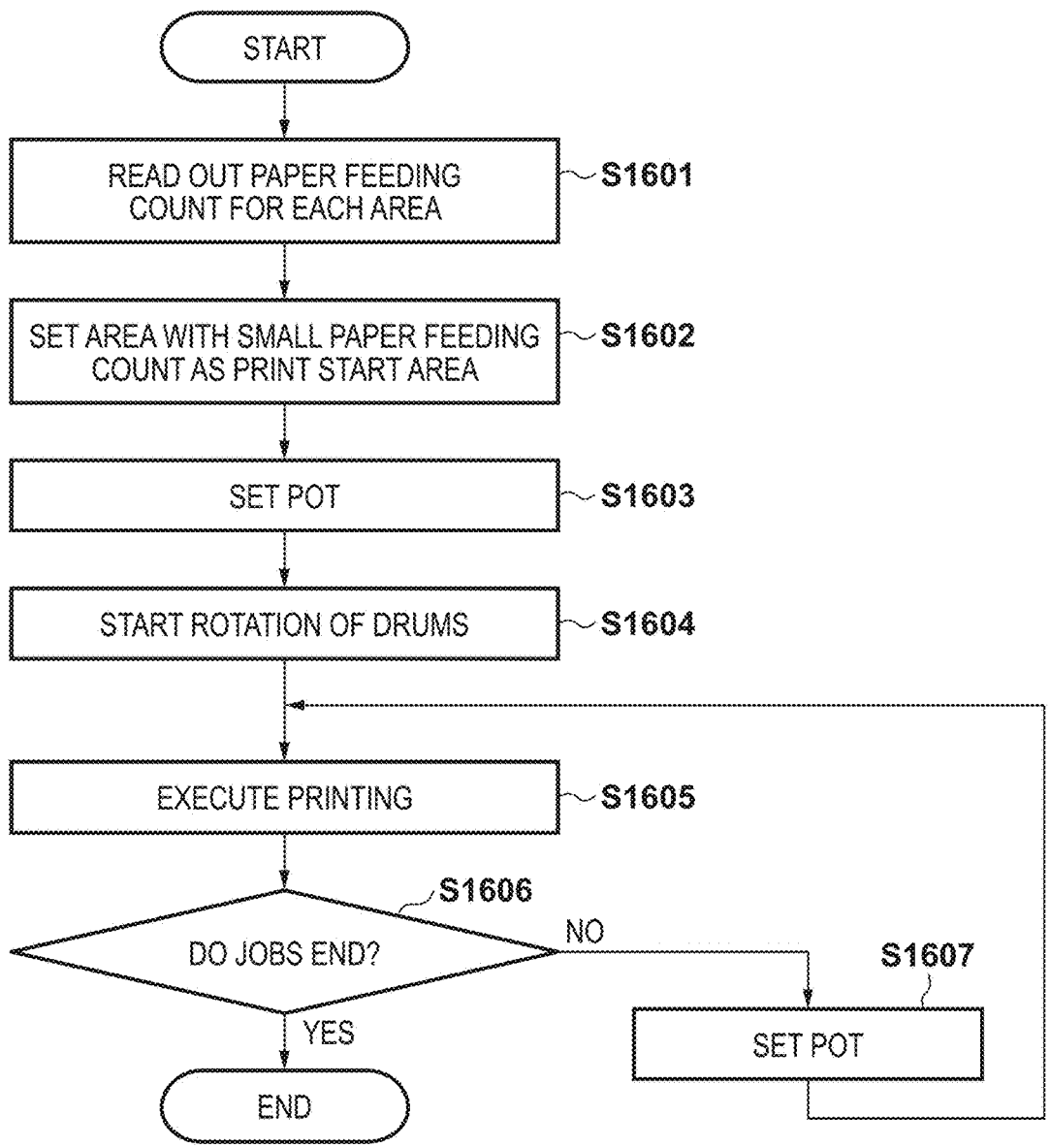
FIG. 16 is a flowchart illustrating the first example of the sequence of processing executed by a printing system.

Note that FIG. 16 shows an example of the control processing of starting printing from a surface with a small paper feeding count. Control may be performed so as to randomly designate a surface from which printing starts. This can also suppress the difference in print count among areas A to D of the transfer member 2, thereby preventing degradation from progressing only in some areas.

(Second Embodiment)

The first embodiment has explained the example of setting areas of the transfer member 2 to be used at the start of printing among the plurality of jobs or the plurality of POTs. To the contrary, this embodiment will describe processing of switching an area of a transfer member 2 to be used for printing in one job (one POT).

Figure 19:
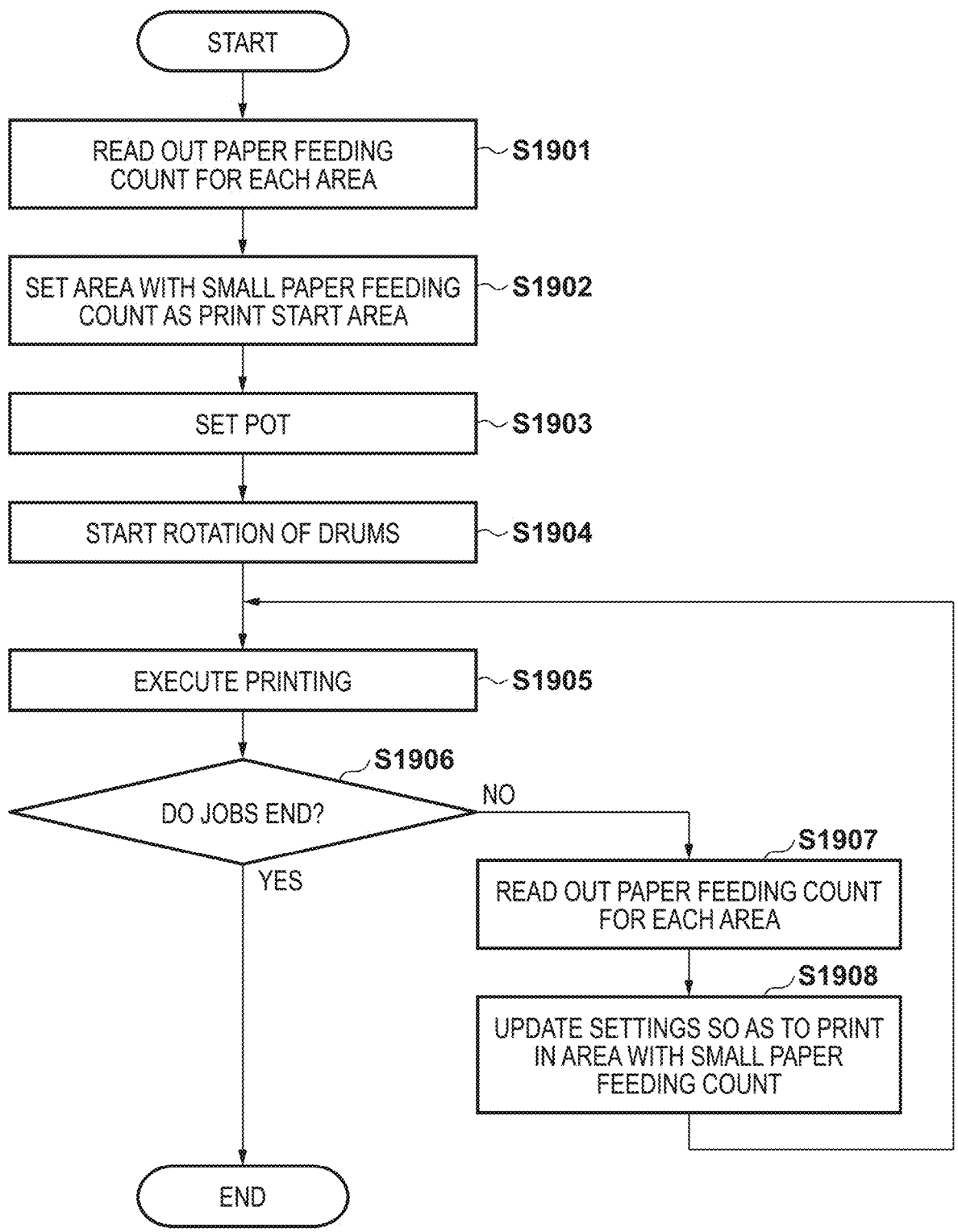
FIG. 19 is a flowchart illustrating the second example of the sequence of processing executed by a printing system.

FIG. 18A shows an example of a POT according to this embodiment. FIG. 18B shows the use counts of the respective areas of the transfer member 2 for printing. FIG. 19 shows the sequence of printing processing according to this embodiment. Note that processes in steps S1901 to S1906 are the same as those in steps S1601 to S1606 and a description thereof will be omitted. A main controller 13A reads out the paper feeding count for each print area (step S1907) until all jobs end (while NO is determined in step S1906), and updates the POT so as to execute printing in the print area with a smallest paper feeding count (step S1908). In the example shown in FIG. 18A, the main controller 13A updates the POT so as to execute printing in areas B and D each with a small paper feeding count in No. 11. For example, since the paper feeding counts for areas A, B, C, and D in Nos. 1 to 10 are cumulatively 3, 0, 2, 0, the main controller 13A inserts "Non" into No. 11, thereby making setting to print image 6 in area D. As a result, as shown in FIG. 18B, the difference in print count among the areas of the transfer member 2 is eliminated, thereby making it possible to prevent degradation from progressing only in a specific area.

Figure 20:
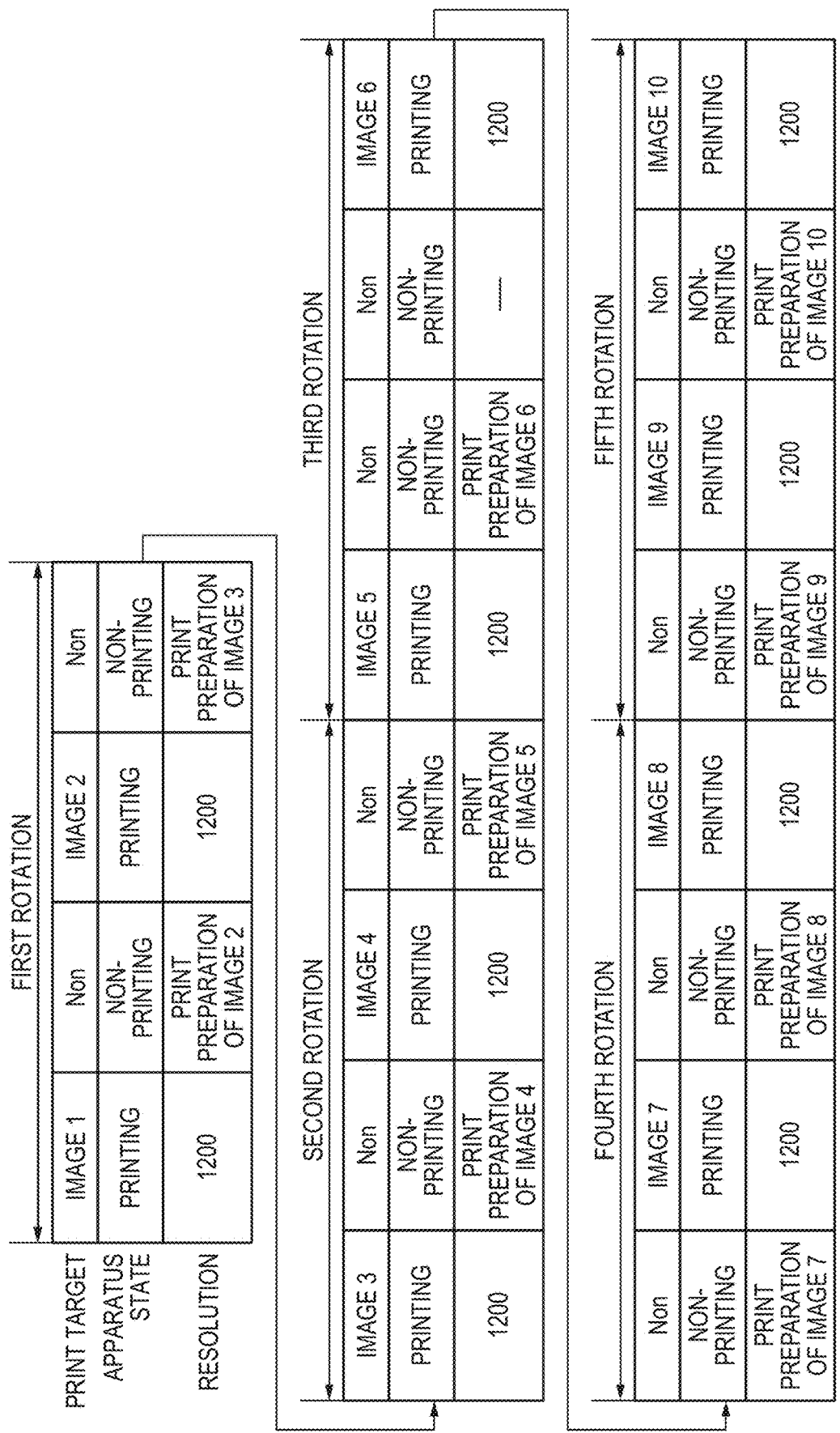
FIG. 20 is a view showing the second example of processing executed by the printing system.

FIG. 20 shows an example of processing when the POT shown in FIG. 18A is used. As shown in FIG. 20, image 1 of 1,200 dpi is printed on the first sheet in the first rotation. After that, since there is a delay caused by image processing of image 2, "Non" is set for a period for the image processing and the like, that is, the period of the second sheet in the first rotation, and then image 2 is printed on the third sheet in the first rotation. Since image 3 is also an image of 1,200 dpi, "Non" is set for the period of the fourth sheet in the first rotation as a period for image processing and the like, and image 3 is printed on the first sheet in the second rotation. Similarly, images 4 and 5 are printed. Since image 6 is also an image of 1,200 dpi, "Non" is set for the period of the second sheet in the third rotation as a period for image processing and the like. To change the area of the transfer member 2 to be used for printing, "Non" is also set for the period of the third sheet in the third rotation. Then, image 6 is printed on the fourth sheet in the third rotation. After that, a period for image processing and the like and a period during which printing is executed are alternately set.

Note that the update timing in steps S1907 and S1908 can be set at the timing when printing of a predetermined number (in the example of FIG. 18A, five) of sheets is completed. However, the update timing can be set appropriately for, for example, every predetermined time. In the processing example of FIG. 19, the POT is updated at the timing of updating the POT so as to print the image in the area with a small paper feeding count. However, for example, the POT may be set to change the area of the transfer member 2 to be used for every predetermined number of sheets during the job in step S1903. That is, as in each of the above-described examples, in the job of printing 10 images in Nos. 1 to 20, the POT in which "Non" is inserted into No. 11 is preset so that the area to be used to print the next image is changed after the end of printing of five images corresponding to half of the 10 images. The POT may be set in step S1903 so that the area to be used is changed randomly during the job. Thus, it is possible to suppress the difference in use count for printing among the areas of the transfer member 2, thereby preventing degradation of components only in some areas from progressing.

Note that each of the above-described embodiments is applicable even in, for example, an environment in which an image of 600 dpi and an image of 1,200 dpi are mixed and printed. For example, a POT shown in FIG. 21A can be updated, as shown in FIG. 21C, by updating the POT according to the above-described second embodiment. FIG. 21B shows the use counts of the respective areas when the POT shown in FIG. 21A is used intact. FIG. 21D shows the use counts of the respective areas when the POT is updated, as shown in FIG. 21C. It is found from FIGS. 21B and 21D that the use frequencies of the respective areas of the transfer member 2 can be distributed even in the environment in which the image of 600 dpi and the image of 1,200 dpi are mixed and printed. As a result, it is possible to prevent the components only in some areas from degrading. Note that the same effect can be obtained by appropriately setting an area to be used among the areas of the transfer member 2 for each job, as in the first embodiment.

Figure 22A:
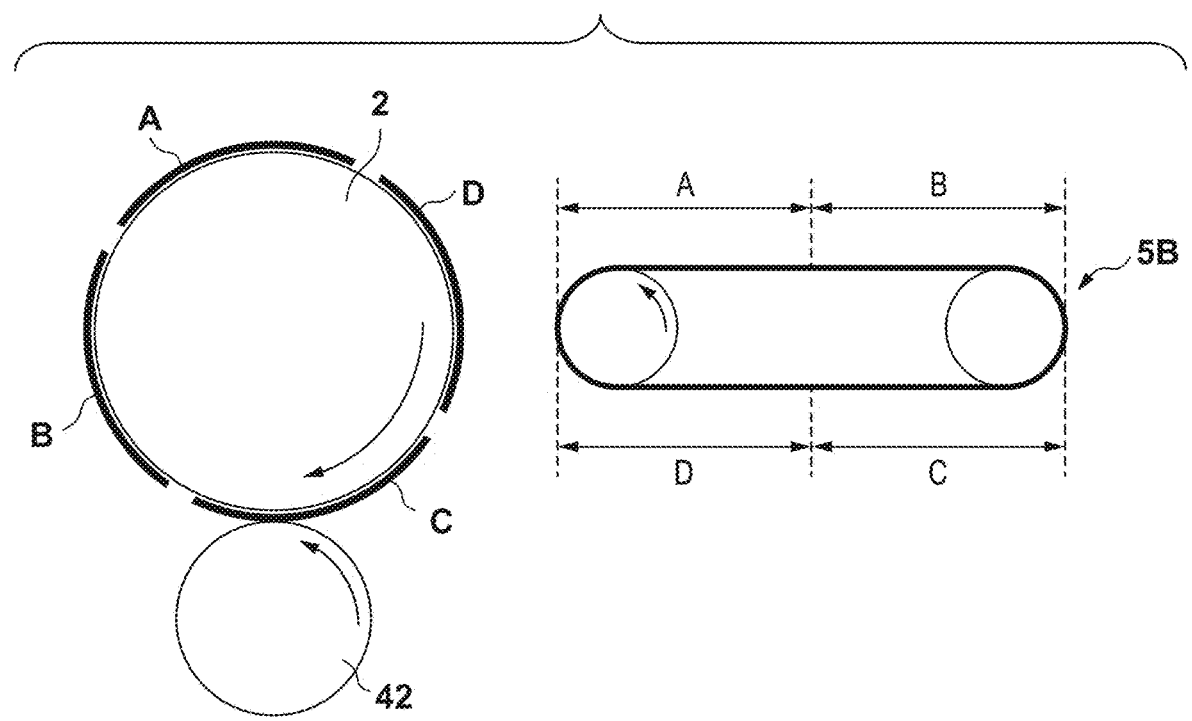
FIGS. 22A and 22B are views for explaining the relationship between a transfer member and an absorption unit.
Figure 22B:
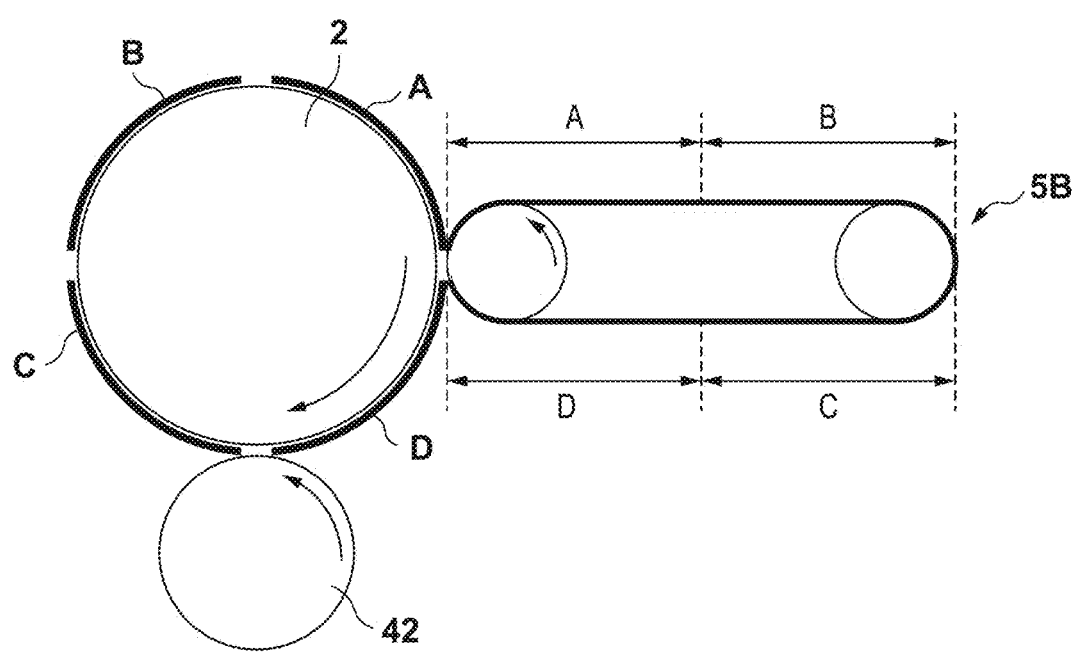

The above description has been provided by paying attention to degradation of the component provided in each area of the transfer member 2. According to the above-described embodiments, it is also possible to prevent another component from degrading locally. For example, if an absorption unit 5B is formed into an endless sheet-like shape and its peripheral length is equal to that of the transfer member 2, the sheet of the absorption unit 5B includes four absorbing areas respectively corresponding to areas A to D. FIG. 22A shows this state. As shown in FIG. 22A, the sheet of the absorption unit 5B includes areas A to D so as to correspond to areas A to D of the transfer member 2. The transfer control unit 15B controls the absorption unit 5B so that each area of the absorption unit 5B contacts the corresponding area of the transfer member 2 at the time of printing. FIG. 22B shows a state in which this control processing performs control so that area A of the transfer member 2 contacts area A of the absorption unit 5B. In this case, there is a difference among the areas of the transfer member 2 where printing is executed, causing a difference among the areas of the absorption unit 5B to be used. To the contrary, the method described in each of the above-described embodiments can prevent the absorption unit 5B from degrading locally. Note that as shown in FIGS. 22A and 22B, the number of areas of the absorption unit 5B need not match the number of areas of the transfer member 2. For example, a larger number may be a multiple of a smaller number. To implement this, the peripheral length of the sheet of the absorption unit 5B corresponds to a multiple of the peripheral length of the transfer member 2. In this way, for example, the absorption unit 5B may include eight areas, and two of these areas may contact one area A of the transfer member 2. Therefore, an area of the absorption unit 5B contacts area A of the transfer member every four areas. In this case, in an environment in which only one area of the transfer member 2 is used, degradation may progress only in corresponding two areas. However, according to the above-described embodiments, the use frequencies of the eight areas are equalized, thereby making it possible to suppress unbalanced degradation from progressing.

Figure 23:
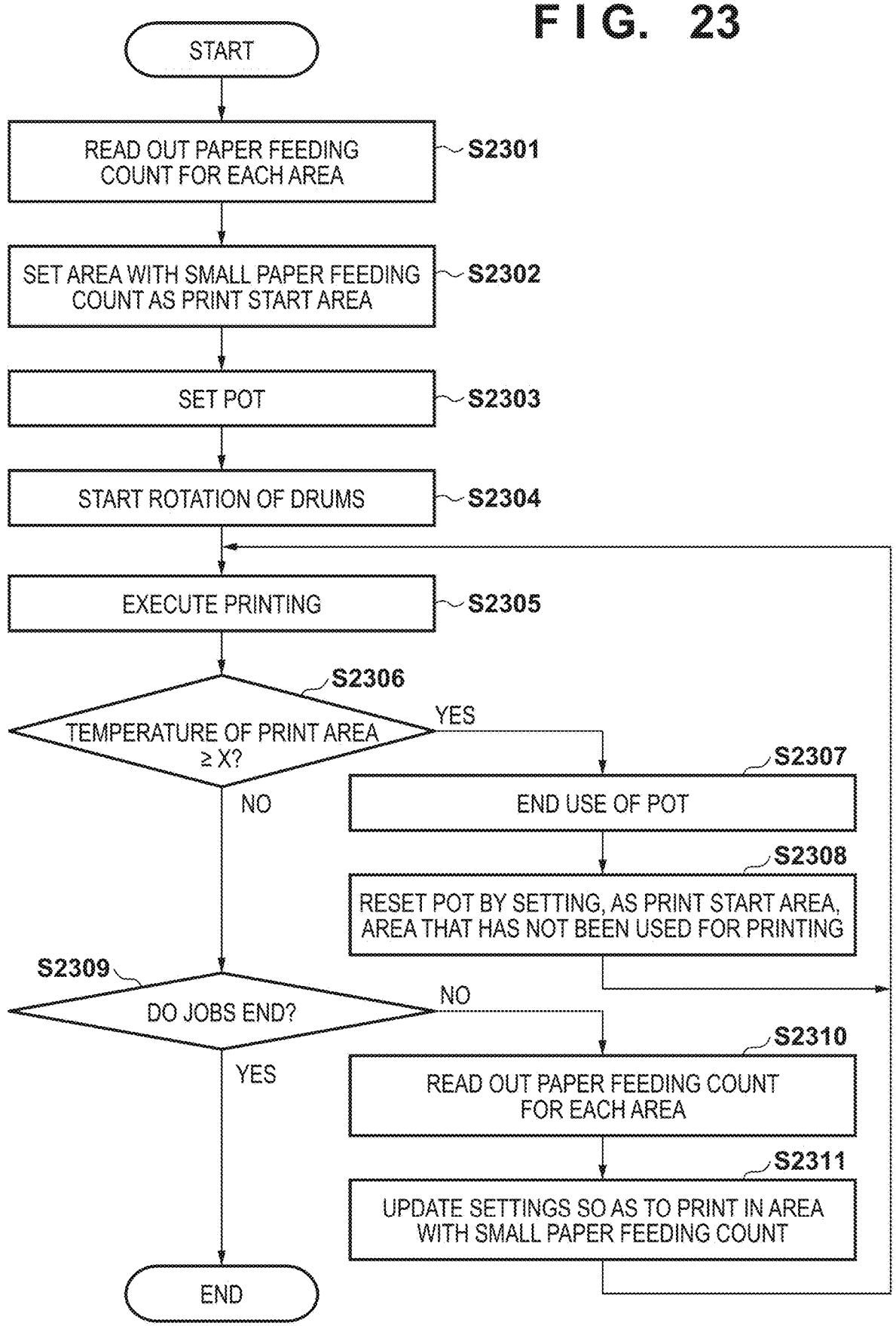
FIG. 23 is a flowchart illustrating the third example of the sequence of processing executed by the printing system.

As described above, in the printing system, after an application unit 5A applies a reactive liquid onto the transfer member 2, the printheads 30 apply ink, and the absorption unit 5B partially absorbs a liquid component of the ink, the heating unit 5C heats to transfer data to the print medium. At this time, if printing is executed in accordance with the POTs shown in FIGS. 13A to 13E, an area that is not used for printing is applied with no ink, and thus contains a small water content, and it is thus considered that the temperature tends to be high by the heating unit 5C. If the temperatures of only some areas become high, the materials of the areas tend to degrade, as compared with the materials of the remaining areas. To cope with this, by setting the POT as in each of the above-described embodiments, it is possible to eliminate a degradation among the areas of the transfer member 2 to be used, thereby suppressing degradation in only some areas caused by high temperatures. Note that a temperature sensor (not shown) may be attached to the transfer member 2, and generation of a POT may be controlled in accordance with temperature information acquired by the sensor for each of areas A to D of the transfer member 2 at the time of printing. FIG. 23 shows an example of the sequence of processing in this case. Note that processes in steps S2301 to S2305 of FIG. 23 are the same as those in steps S1601 to S1605 of FIG. 16 and those in steps S1901 to S1905 of FIG. 19 and a description thereof will be omitted. Furthermore, processes in steps S2309 to S2311 are the same as those in steps S1906 to S1908 of FIG. 19 and a description thereof will be omitted. If printing starts, monitoring of the temperature of each area of the transfer member 2 starts during execution of printing processing. If the temperature of one of the areas becomes equal to or higher than a predetermined threshold X (YES in step S2306), the use of the currently set POT ends (step S2307). After that, the printing control unit 15A presets the POT so as to execute printing using the area that has not been used for printing (step S2308). Note that an example of control of replacing the POT when the temperature of one of the areas of the transfer member 2 becomes equal to or higher than the predetermined threshold has been explained. However, control of temporarily ending a job without replacing the POT may be performed.

As described above, the printing system is configured so that a cleaning unit 5D cleans ink remaining on the transfer member 2 after transferring an image to a cut sheet. In this case, the transfer member 2 is cleaned regardless of whether ink remains on the transfer member 2. If ink remains, it is considered that degradation of a material progresses by friction at the time of cleaning or a force at the time of peeling off the remaining ink, as compared with a case in which no ink remains. To cope with this, by setting the POT as in each of the above-described embodiments, it is possible to eliminate a difference among areas of the transfer member 2 to be used, thereby suppressing degradation of the transfer member 2 caused by cleaning of the remaining ink.

Each of the above-described embodiments has explained the example of the method of controlling the areas of the transfer member 2 to be used by monitoring the paper feeding count corresponding to each area of the transfer member 2. Control may be performed based on the number of printed sheets as the number of times printing is actually executed in each area. Each of the above-described embodiments has explained the example when the image processing and the like for the image of 1,200 dpi end within twice the unit transfer time. The present invention, however, is not limited to this. For example, from the viewpoint of the conveyance property, the above-described processing is applicable even if the print medium is conveyed at a predetermined time interval and a difference occurs in use count for printing among the areas of the transfer member 2.

Note that this embodiment has been explained by assuming that the transfer member 2 has a cylindrical shape. The present invention, however, is not limited to this. For example, the transfer member 2 may be formed by a belt of a free form or the like. In this case, the belt includes a plurality of areas where a plurality of ink images are formed and transferred to cut sheets in one round, like areas A to D described above, and thus has a peripheral length determined in accordance with the length of the cut sheet usable for printing. In this case as well, each of the above-described methods can prevent degradation from progressing significantly only in a specific area of the transfer member 2.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-131496, filed Jul. 4, 2017, which is hereby incorporated by reference herein in its entirety.

What is claimed is:

1. A printing apparatus comprising:
a conveyance mechanism including a conveyance member for conveying a cut sheet, the conveyance mechanism being configured to convey the cut sheet by moving the conveyance member;
a transfer member configured to cyclically pass through a formation area of an ink image and a transfer area where the ink image is transferred to the cut sheet, the transfer member having a peripheral length corresponding to a length of the cut sheet to which the ink image can be transferred, and including a plurality of areas that allow printing on a plurality of cut sheets in one rotation;
a print head including a nozzle through which ink is discharged to the transfer member based on print data, the print head being configured to form the ink image on the transfer member in the formation area;
a transfer mechanism including a pressing member for pressing a cut sheet to transfer the ink image from the transfer member to the cut sheet conveyed by the conveyance mechanism in the transfer area;
a memory that stores instructions; and
one or more processors coupled to the memory, and configured to execute the instructions to function as:
an acquisition unit configured to acquire the print data for forming the ink image on the transfer member, the print data being obtained by performing image processing on data representing an image of a print target; and
a control unit configured to control the print head so as to use some areas, of the plurality of areas of the transfer member, for the formation of the ink image and so as not to use remaining areas, of the plurality of areas of the transfer member, for the formation of the ink image, by deciding, in accordance with information on a use count of each area, of the plurality of areas of the transfer member, for printing an image on cut sheets, an area on which an ink image based on the print data is formed so as to use, for printing, an area, of the plurality of areas of the transfer member, having a use count that is lowest, among the plurality of areas of the transfer member, more often than other areas of the plurality of areas of the transfer member.

2. The printing apparatus according to claim 1, wherein, for one of (i) every predetermined time, and (ii) every time printing is executed on a predetermined number of cut sheets, the control unit decides a specific area, of the plurality of areas of the transfer member, to be used to transfer the ink image of the print data to the cut sheet.

3. The printing apparatus according to claim 1, wherein the control unit controls the print head so as to start printing from the area having the use count that is lowest, among the plurality of areas of the transfer member.

4. The printing apparatus according to claim 1, wherein the control unit sets a number of copies by stopping the formation of the ink image by the print head and the conveyance of the cut sheet by the conveyance mechanism, without stopping rotation of the transfer member, in accordance with a time taken to perform the image processing on the print target, that is determined based on information concerning a period related to processing of image data representing the image of the print target.

5. The printing apparatus according to claim 4, wherein the control unit sets, based on a time, a period during which the formation of the ink image by the print head and the conveyance of the cut sheet by the conveyance mechanism are stopped.

6. The printing apparatus according to claim 1, wherein using information of a schedule indicating whether to execute printing, the control unit controls whether to stop the formation of the ink image by the print head and the conveyance of the cut sheet by the conveyance mechanism.

7. The printing apparatus according to claim 6, wherein the control unit generates the information of the schedule based on one of (i) information concerning a time taken to process the image data representing the image of the print target, and (ii) information concerning a time interval at which the conveyance mechanism conveys the cut sheet.

8. The printing apparatus according to claim 6, wherein, during execution of printing, the control unit updates the information of the schedule so as to use the area having the lowest use count for printing.

9. The printing apparatus according to claim 1, further comprising a mechanism configured to absorb a liquid component from the ink image formed on the transfer member by making a liquid absorbing member contact the plurality of areas of the transfer member,
wherein the liquid absorbing member includes a plurality of areas, respectively corresponding to the plurality of areas of the transfer member, and is configured so that each area, of the plurality of areas, of the liquid absorbing member, contacts the corresponding area, of the plurality of areas, of the transfer member.

10. The printing apparatus according to claim 1, further comprising a heater that generates energy to heat each of the plurality of areas of the transfer member between the print head and the transfer mechanism,
wherein the transfer mechanism transfers, to the cut sheet, the ink image heated by the heater.

11. The printing apparatus according to claim 10, further comprising a sensor configured to monitor temperatures of the plurality of areas of the transfer member,
wherein, if the temperature of one of the plurality of areas of the transfer member is not lower than a predetermined threshold, the area having a temperature that is not lower than the predetermined threshold is decided to be used as an area where the ink image of the print data is transferred to the cut sheet.

12. The printing apparatus according to claim 1, further comprising a cleaning mechanism including a member for cleaning an obverse layer of each of the plurality of areas of the transfer member.

13. A printing system comprising:
a conveyance mechanism including a conveyance member for conveying a cut sheet, the conveyance mechanism being configured to convey the cut sheet by moving the conveyance member;
a transfer member configured to cyclically pass through a formation area of an ink image and a transfer area where the ink image is transferred to the cut sheet, having a peripheral length corresponding to a length of the cut sheet to which the ink image can be transferred, and including a plurality of areas that allow printing on a plurality of cut sheets in one rotation;
a print head including a nozzle through which ink is discharged to the transfer member based on print data, the print head being configured to form the ink image on the transfer member in the formation area;
a transfer mechanism including a pressing member for pressing a cut sheet to transfer the ink image from the transfer member to the cut sheet conveyed by the conveyance mechanism in the transfer area;
a memory that stores instructions; and
one or more processors coupled to the memory, and configured to execute the instructions to function as:
an acquisition unit configured to acquire the print data for forming the ink image on the transfer member, the print data being obtained by performing image processing on data representing an image of a print target; and
a control unit configured to control the print head so as to use some areas, of the plurality of areas of the transfer member, for the formation of the ink image and so as not to use remaining areas, of the plurality of areas of the transfer member, for the formation of the ink image, by deciding, in accordance with information on a use count of each of the plurality of areas of the transfer member, for printing an image on cut sheets, an area on which an ink image based on the print data is formed so as to use, for printing, an area, of the plurality of areas of the transfer member, having a use count that is lowest, among the plurality of areas of the transfer member, more often than other areas of the plurality of areas of the transfer member.

14. A control method for a system that forms a printed product using a conveyance mechanism including a conveyance member for conveying a cut sheet, the conveyance mechanism being configured to convey the cut sheet by moving the conveyance member, a transfer member configured to cyclically pass through a formation area of an ink image and a transfer area where the ink image is transferred to the cut sheet, the transfer member having a peripheral length corresponding to a length of the cut sheet to which the ink image can be transferred, and including a plurality of areas that allow printing on a plurality of cut sheets in one rotation, a print head including a nozzle through which ink is discharged to the transfer member based on print data, the print head being configured to form the ink image on the transfer member in the formation area, and a transfer mechanism including a pressing member for pressing a cut sheet to transfer the ink image from the transfer member to the cut sheet conveyed by the conveyance mechanism in the transfer area, the method comprising:
acquiring the print data for forming the ink image on the transfer member, the print data being obtained by performing image processing on data representing an image of a print target; and
controlling the print head so as to use some areas, of the plurality of areas of the transfer member, for the formation of the ink image and so as not to use remaining areas, of the plurality of areas of the transfer member, for the formation of the ink image, by deciding, in accordance with information on a use count of each of the plurality of areas of the transfer member for printing an image on cut sheets, an area on which an ink image based on the print data is formed so as to use, for printing, an area, of the plurality of areas of the transfer member, having a use count that is lowest, among the plurality of areas of the transfer member, more often than other areas of the plurality of areas of the transfer member.

15. A non-transitory computer-readable storage medium storing a computer program for causing a computer, included in an apparatus of a system, to perform a control method for the system that forms a printed product using a conveyance mechanism including a conveyance member for conveying a cut sheet, the conveyance mechanism being configured to convey the cut sheet by moving the conveyance member, a transfer member configured to cyclically pass through a formation area of an ink image and a transfer area where the ink image is transferred to the cut sheet, the transfer member having a peripheral length corresponding to a length of the cut sheet to which the ink image can be transferred, and including a plurality of areas that allow printing on a plurality of cut sheets in one rotation, a print head including a nozzle through which ink is discharged to the transfer member based on print data, the print head being configured to form the ink image on the transfer member in the formation area, and a transfer mechanism including a pressing member for pressing a cut sheet to transfer the ink image from the transfer member to the cut sheet conveyed by the conveyance mechanism in the transfer area, the control method comprising:
acquiring the print data for forming the ink image on the transfer member, the print data being obtained by performing image processing on data representing an image of a print target; and
controlling the print head so as to use some areas, of the plurality of areas of the transfer member, for the formation of the ink image and so as not to use remaining areas, of the plurality of areas of the transfer member, for the formation of the ink image, by deciding, in accordance with information on a use count of each of the plurality of areas of the transfer member for printing an image on cut sheets, an area on which an ink image based on the print data is formed so as to use, for printing, an area, of the plurality of areas of the transfer member, having a use count that is lowest, among the plurality of areas of the transfer member, more often than other areas of the plurality of areas of the transfer member.

* * * * *